United States Patent
Hansen et al.

(10) Patent No.: US 9,169,001 B2
(45) Date of Patent: Oct. 27, 2015

(54) ZONAL HYDRAULIC SYSTEMS AND METHODS

(75) Inventors: Nicholas John Hansen, Jackson, MS (US); Joseph Matthew Jones, Madison, MS (US); Barry Benaway, Burbank, CA (US)

(73) Assignee: EATON CORPORATION, Cleveland, OH (US)

( * ) Notice: Subject to any disclaimer, the term of this patent is extended or adjusted under 35 U.S.C. 154(b) by 633 days.

(21) Appl. No.: 13/538,859

(22) Filed: Jun. 29, 2012

(65) Prior Publication Data

US 2014/0000737 A1  Jan. 2, 2014

(51) Int. Cl.
*F16D 31/02* (2006.01)
*B64C 13/42* (2006.01)
*F15B 20/00* (2006.01)
*F15B 11/17* (2006.01)

(52) U.S. Cl.
CPC .................. *B64C 13/42* (2013.01); *F15B 11/17* (2013.01); *F15B 20/00* (2013.01); *F15B 20/004* (2013.01); *F15B 2211/20576* (2013.01); *F15B 2211/30505* (2013.01); *F15B 2211/30565* (2013.01); *F15B 2211/3138* (2013.01); *F15B 2211/31535* (2013.01); *F15B 2211/329* (2013.01); *F15B 2211/355* (2013.01); *F15B 2211/8633* (2013.01); *F15B 2211/8752* (2013.01); *Y10T 137/87209* (2015.04)

(58) Field of Classification Search
CPC ........ F15B 11/17; F15B 20/00; F15B 20/004; F15B 2211/8633; F15B 2211/8752; B64C 13/42
USPC ............................................... 60/405; 91/510
See application file for complete search history.

(56) References Cited

U.S. PATENT DOCUMENTS 3,526,468 A 9/1970 Moon et al.
7,191,593 B1 3/2007 Ho

FOREIGN PATENT DOCUMENTS

EP 2 439 139 A2 4/2012

OTHER PUBLICATIONS

International Search Report and Written Opinion for PCT/US2013/046750 mailed Sep. 30, 2013.
Eaton, "Selector Valve Diagram", May 10, 2001, SAE A-6, San Marco Island, Florida.
Eaton, "Hawker Horizon Emergency Rudder System", May 6, 2001, SAE A-6, San Marco Island, Florida.

*Primary Examiner* — Michael Leslie

(57) ABSTRACT

The present disclosure relates to isolation and reconfiguration schemes, architectures and methods for use in aircraft hydraulic systems. The main hydraulic system of each hydraulic section of the aircraft hydraulic system can be isolated from one or more consumers in the event of a leak without the use pressure from the backup system. Further, in some embodiments, the main hydraulic system of each hydraulic section of the aircraft hydraulic system can be isolated from one or more consumers in the event of a leak without the use pressure from the backup system and the main system.

32 Claims, 20 Drawing Sheets

ZONAL HYDRAULIC SYSTEMS AND METHODS

TECHNICAL FIELD

The present disclosure relates generally to zonal hydraulic systems and methods and/or isolation valve arrangement systems and methods. More particularly, the present disclosure relates to zonal hydraulic systems and/or isolation valve arrangements for flight control systems.

INTRODUCTION

Hydraulic fluids or liquids are the medium by which power is transferred in hydraulic machinery. Typical aircraft performance requires large amounts of force to operate mechanical flight controls and, therefore, mechanical flight controls are often powered with hydraulic systems. The hydraulic actuators are controlled by valves. The valves are operated directly by input from the aircrew (hydro-mechanical) or by computers obeying control laws.

SUMMARY

The present disclosure relates to isolation and reconfiguration schemes, architectures and methods for use in aircraft hydraulic systems. The main hydraulic system of each hydraulic section of the aircraft hydraulic system can be isolated from one or more consumers in the event of a leak without the use pressure from the backup system. Further, in some embodiments, the main hydraulic system of each hydraulic section of the aircraft hydraulic system can be isolated from one or more consumers in the event of a leak without the use pressure from the backup system and the main system.

In part, the disclosure describes an isolation valve arrangement. The isolation valve arrangement includes: a main port; a main return port; a backup port; a backup return port; a consumer port; a consumer return port; a first main fluid flow path for a main system; a second main fluid flow path for the main system; a first backup fluid flow path for a backup system; a first pilot operated shutoff valve; a first pilot port; a second pilot operated shutoff valve; a second pilot port; a pilot flow path; and a first solenoid valve. The first main fluid flow path for the main system extends from the main port to the consumer port. The second main fluid flow path for the main system extends from the consumer return port to the main return port. The first backup fluid flow path for the backup system extends from the backup port to the consumer port. The second backup fluid flow path for the backup system extends from the consumer return port to the backup return port. The first pilot operated shutoff valve is located on the first main fluid flow path between the main port and the consumer port. The first pilot operated shutoff valve in a first position provides fluid communication between the main port and the consumer port and in a second position prevents fluid communication between the main port to the consumer port. The first pilot port is connected to the first pilot operated shutoff valve. The second pilot operated shutoff valve is located on the second main fluid flow path between the consumer return port and the main return port. The second pilot operated shutoff valve in a first position provides fluid communication between the consumer return port and the main return port and in a second position prevents fluid communication between the consumer return port and the main return port. The second pilot port is connected to the second pilot operated shutoff valve. The pilot flow path extends from the main port to the first and the second pilot ports of the first and second pilot operated shut off valves. The first solenoid valve is located on the pilot flow path between the main port and the first and the second pilot ports of the first and the second pilot operated shutoff valves. The first solenoid valve in a first position provides fluid communication between the main port and the first and the second pilot ports and in a second position prevents fluid communication between the main port and the first and the second pilot ports. The main system is isolated from a consumer without requiring backup pressure from the backup system.

In yet another aspect, the disclosure describes a zonal hydraulic system. The zonal hydraulic system includes: a power source; a main port; a main return port; a backup port; a backup return port; a consumer port; a consumer return port; a first circuit for a main system; a main pump; a second circuit for a backup system; a backup pump; a first pilot operated shutoff valve; a first pilot port; a second pilot operated shutoff valve; a second pilot port; a pilot flow path; and a first solenoid valve. The first circuit is for the main system and extends from the main port to the consumer port through a consumer and back from the consumer return port to the main return port. The main pump is connected to the main port and the main return port. The main pump is configured to pump main fluid through the main port and to receive the main fluid returned through the main return port. The second circuit is for a backup system and extends from the backup port to the consumer port through the consumer and back from the consumer return port to the backup return port. The backup pump is connected to the backup port and the backup return port. The backup pump is configured to pump backup fluid through the backup port and to receive the backup fluid returned through the backup return port. The first pilot operated shutoff valve is located on the first circuit between the main port and the consumer port. The first pilot operated shutoff valve in a first position provides fluid communication between the main port and the consumer port and in a second position prevents fluid communication between the main port and the consumer port. The first pilot port is connected to the first pilot operated shutoff valve. The second pilot operated shutoff valve is located on the first circuit between the consumer return port and the main return port. The second pilot operated shutoff valve in a first position provides fluid communication between the consumer return port and the main return port and in a second position prevents fluid communication between the consumer return port and the main return port. The second pilot port is connected to the second pilot operated shutoff valve. The pilot flow path extends from the main port to the first and the second pilot ports of the first and second pilot operated shut off valves. The first solenoid valve is connected to an electrical power source and is located on the pilot flow path between the main port and the first and the second pilot ports of the first and the second pilot operated shutoff valves. The first solenoid valve in a first position provides fluid communication between the main port and the first and the second pilot ports and in a second position prevents fluid communication between the main port and the first and the second pilot ports. The first circuit is isolated from the consumer without requiring utilization of the backup fluid.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclose herein are based.

DETAILED DESCRIPTION

Reference will now be made in detail to exemplary aspects of the present disclosure that are illustrated in the accompanying drawings. Wherever possible, the same reference numbers will be used throughout the drawings to refer to the same or like structures.

The present disclosure relates to isolation and reconfiguration schemes, architectures and methods for use in aircraft hydraulic systems. The aircraft hydraulic system provides hydraulic power to consumers on the aircraft, such as critical and non-critical flight controls. For example, the aircraft hydraulic system provides power to a rudder, right hand elevator (RH elevator), right hand ailerons (RH ailerons), and left hand ailerons (LH ailerons), which are all critical for flight controls.

Accordingly, the aircraft hydraulic system described herein provides two separate sections each providing power to the consumers to ensure that the necessary consumers receive power. Further, each hydraulic section includes a main hydraulic system and a backup hydraulic system to ensure that power is provided to the consumers. Additionally, each section includes a zonal hydraulic system and/or an isolation valve arrangement to provide isolation of the main system from the consumer in the event of a leak to ensure that necessary consumers receive needed hydraulic power. The main hydraulic system is isolated from one or more consumers in the event of a leak without the use of pressure from the backup system. In some embodiments, the main hydraulic system is isolated from one or more consumers in the event of a leak without the use pressure from the backup system and the main system.

Figure 1:
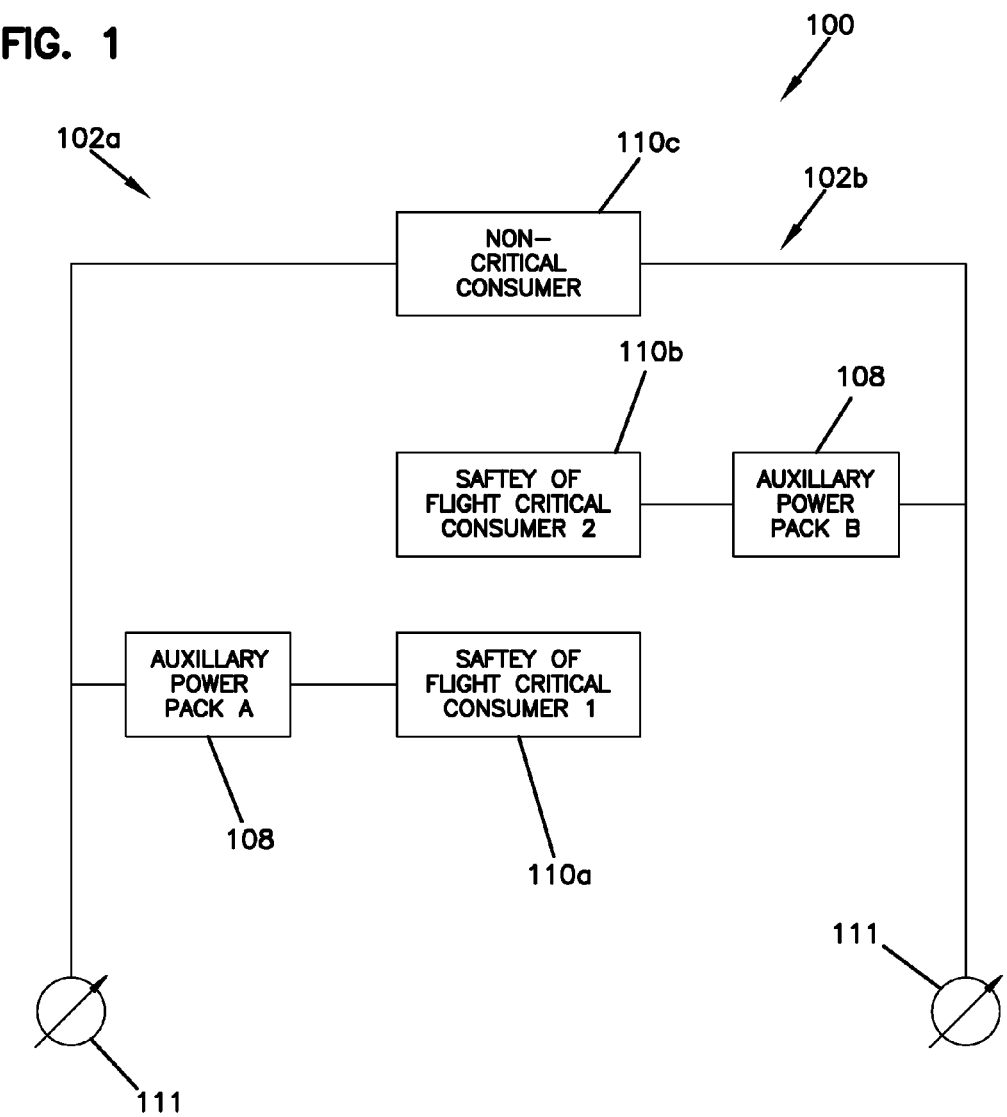
FIG. 1 illustrates an embodiment of a schematic of an aircraft hydraulic system including two separate hydraulic system sections in accordance with the principles of the present disclosure.

FIG. 1 illustrates an embodiment of the aircraft hydraulic system 100. The aircraft hydraulic system 100 includes two separate hydraulic sections 102a and 102b. Each section 102 includes a main system 104, a backup system 108, and an electrical power source 106. Hydraulic power or pressure from the main system 104 or backup system 108 is utilized to power one or more consumers 110. The consumers 110 include any aircraft component that is being powered by hydraulic power from a hydraulic section 102, such as critical and non-critical flight controls. For example, FIG. 1 illustrates the following consumers 110: safety of flight critical consumer A 110a, safety of flight critical consumer B 110b, and non-critical consumer 110c. In some embodiments the consumers include an RH elevator, a rudder, RH aileron, LH aileron, left hand elevator, nose wheel steering, landing gear, slats, inboard airbrakes, outboard airbrakes, and etc.

Each section 102 is a separate hydraulic power source for the one or more consumers 110. Each section 102 provides an auxiliary power source (from the backup system 108) and fault isolation to select consumers 110. Typically, select consumers 110 are critical flight controls. As illustrated in FIG. 1, first section 102a provides backup power to a first set of critical flight controls (safety of flight critical consumer A). As illustrated in FIG. 1, section 102b provides backup power to a second set of critical flight controls (safety of flight critical consumer B). The fault isolation provided by each section 102 is provided by utilizing a zonal hydraulic system and/or an isolation valve arrangement that isolates the one or more consumers 110 from the main system 104 without requiring pressure from the backup system 108. In some embodiments, the fault isolation provided by each section 102 is provided by utilizing a zonal hydraulic system and/or an isolation valve arrangement that isolates the one or more consumers 110 from the main system 104 without requiring pressure from the backup system 108 and without requiring pressure from the main system 104.

FIGS. 2-20 illustrate embodiments of different hydraulic system sections 102 in various modes, such as a main mode, a backup mode, and an isolation mode. The main mode of operation provides hydraulic power to the one or more consumers 110 though a main circuit (also referred to as a first circuit) 114 as illustrated in FIGS. 2, 5, 8, 11, 14, and 17. The backup mode of operation provides hydraulic power to the one or more consumers 110 through a backup circuit (also referred to a second circuit) 118 as illustrated in FIGS. 3, 6, 9, 12, 15, and 18. The isolation mode of operation isolates the main circuit 114 from the one or more consumers 110 without requiring pressure from the backup system 108 as illustrated in FIGS. 4, 7, 10, 13, 16, and 19-20. In some embodiments, the isolation mode of operation isolates the main circuit 114 from the consumer 110 without requiring pressure from the backup system 108 and without requiring pressure from the main system 104 as illustrated in FIG. 19.

The consumer 110 includes a consumer port 120 and a consumer return port 122. The consumer 110 is powered by receiving hydraulic pressure from hydraulic fluid through the consumer port 120 and returns the hydraulic fluid through the consumer return port 122. As discussed above, the consumer 110 is any flight component, such as flight controls, that utilizes hydraulic power from the hydraulic section 102.

The main system 104 includes a main pump 111, a main port 112, a main return port 113, and a main circuit 114. The main pump 111 is connected to the main port 112 and the main return port 113. The main circuit 114 of the main system 104 includes a first main fluid flow path 115 and second main fluid flow path 116. The first main fluid flow path 115 extends from the main port 112 to the consumer port 120. The second main fluid flow path 116 extends from the consumer return port 122 to the main return port 113. Accordingly, the main pump 111 pumps main hydraulic fluid (also referred to as main fluid) through the main port 112 to the consumer port 120 through the first main fluid flow path 115 of the first circuit 114. The main hydraulic fluid is returned from the consumer 110 by flowing from the consumer return port 122 to the main return port 113 through the second main fluid flow path 116 of the first circuit 114 and thereby returning the main hydraulic fluid to the main pump 111. Therefore, the main system 104 provides a main pressure to the consumer 110 to power the consumer 110 via the pumping of the main hydraulic fluid through the main circuit 114.

The backup system 108 includes a backup pump 124, a backup port 126, a backup return port 128, and a backup circuit 118. The backup pump 124 is connected to the backup port 126 and the backup return port 128. The backup circuit 118 of the backup system 108 includes a first backup fluid flow path 130 and second backup fluid flow path 132. The first backup fluid flow path 130 extends from the backup port 126 to the consumer port 120. The second backup fluid flow path 132 extends from the consumer return port 122 to the backup return port 128. Accordingly, the backup pump 124 pumps backup hydraulic fluid (also referred to as backup fluid) through the backup port 126 to the consumer port 120 through the first backup fluid flow path 130 of the second circuit 118. The backup hydraulic fluid is returned from the consumer 110 by flowing from the consumer return port 122 to the backup return port 128 through the second backup fluid flow path 132 of the second circuit 118 and thereby returning the backup hydraulic fluid to the backup pump 124. Therefore, the backup system 108 provides a backup pressure to the consumer 110 to power the consumer 110 via the pumping of the backup hydraulic fluid through the backup circuit 118.

The hydraulic system sections 102 illustrated in FIGS. 2-20 further include a first pilot operated shutoff valve 134, a first pilot port 140, a second pilot operated shutoff valve 136, a second pilot port 142, pilot flow path 135, and a first solenoid valve 138. The first pilot operated shutoff valve 134 is located on the first main fluid flow path 115 between the main port 112 and the consumer port 120 that in a first position provides fluid communication between the main port 112 and the consumer port 120 and in a second position prevents fluid communication between the main port 112 to the consumer port 120. The first pilot operated shutoff valve 134 includes a first pilot port 140.

The second pilot operated shutoff valve 136 is located on the second main fluid flow path 116 between the consumer return port 122 and the main return port 113 that in a first position provides fluid communication between the consumer return port 122 and the main return port 113 and in a second position prevents fluid communication between the consumer return port 122 and the main return port 113. The second pilot operated shutoff valve 136 includes a second pilot port 142.

The pilot flow path 135 extends from the main circuit 114 to the first pilot port 140 of the first pilot operated shutoff valve 134 and extends to the second pilot port 142 of the second pilot operated shutoff valve 136. Therefore, the main port 112 of the main circuit 114 is connected to the first and second pilot ports 140, 142 of the first and second pilot operated shutoff valves 134, 136.

The first solenoid valve 138 is located on the pilot flow path 135 between the main port 112 and the first and the second pilot ports 140, 142 of the first and the second pilot operated shutoff valves 134, 136. The first solenoid 138 in a first position provides fluid communication between the main port 112 and the first and the second pilot ports 140, 142. Accordingly, when the first solenoid valve 138 is in the first position and the main pump 111 is pumping main hydraulic fluid though the main circuit 114, the first and second pilot ports 140, 142 receive main hydraulic fluid or pressure actuating the first and second pilot operated shutoff valves 134, 136. The first solenoid valve 138 in a second position prevents fluid communication between the main port 112 and the first and the second pilot ports 140, 142. Therefore, when the first solenoid valve 138 is in the second position or if the main pump 111 is not pumping main hydraulic fluid though the main circuit 114, then the first and second pilot ports 140, 142 do not receive main hydraulic fluid or pressure and do not actuate the first and second pilot operated shutoff valves 134, 136. Accordingly, the first and second pilot operated shutoff valves 134, 136 remain in a spring biased position when the first solenoid valve 138 is in the second position or if the main pump 111 is not pumping main hydraulic fluid though the main circuit 114.

Referring to FIGS. 2-4 and 20, an embodiment of a of a hydraulic system section 102c in a main mode, a backup mode, and an isolation mode of operation in accordance with the principles of the present disclosure are illustrated. In this embodiment of the hydraulic system section 102c, the first solenoid valve 138 is spring biased into a second position and the first and second pilot operated shutoff valves 134, 136 are spring biased into a first position. In this embodiment, the hydraulic system section 102c further includes three one-way valves 144, a third pilot operated shutoff valve 150 including a third pilot port 152, a flow path valve 146, and a second solenoid valve 148.

The third pilot operated shutoff valve 150 is located on the second backup flow path 132 of the second circuit 118 between the consumer return port 122 and the backup return port 128. The third pilot port 152 on the third pilot operated shutoff valve 150 is located on the pilot flow path 135 adjacent to the second pilot port 142. The third pilot operated shutoff valve 150 in hydraulic system section 102c prevents fluid communication between the consumer return port 122 and the backup return port 128 when the third pilot operated shutoff valve 150 is in a spring biased position. The third pilot operated shutoff valve 150 in hydraulic system section 102c provides fluid communication between the consumer return port 122 and the backup return port 128 when the third pilot operated shutoff valve 150 is in an actuated position.

The one-way valves 144 may include check valves. The first one-way valve 144 is located on the first main fluid flow path 115 of the main circuit 114 between the main port 112 and the consumer port 120. The first one-way valve 144 only allows hydraulic fluid to flow from the main port 112 to the consumer port 120 and prevents flow of hydraulic fluid in the opposite direction.

The second one-way valve 144 is located on the first backup fluid flow path 130 of the backup circuit 118 between the backup port 126 and the consumer port 120. The second one-way valve 144 only allows hydraulic fluid to flow from the backup port 126 to the consumer port 120 and prevents flow of hydraulic fluid in the opposite direction.

The third one-way valve 144 is located on the second main fluid flow path 116 between the main return port 113 and the second pilot operated shutoff valve 136. The third one-way valve 144 only allows hydraulic fluid to flow from the consumer return port 122 to the main return port 113 and prevents the hydraulic fluid from flowing in the opposite direction.

The flow path valve 146 in this embodiment is a shuttle valve. In some embodiments, the shuttle valve 146 is a two-way valve. The flow path valve 146 is located on first main fluid flow path 115 of the first circuit 114 between the main port 112 and the pilot flow path 135 and is located on the first backup fluid flow path 130 of the second circuit 118 between the backup port 126 and the pilot flow path 135. The flow path valve 146, which is shuttle valve 146 in this embodiment, in a first position provides fluid communication between the main port 112 and the pilot flow path 135 while further preventing fluid communication between the backup port 126 and the pilot flow path 135. The flow path valve 146 in a second position provides fluid communication between the backup port 126 and the pilot flow path 135 while further preventing fluid communication between the main port 112 and the pilot flow path 135. Accordingly, the flow path valve 146 prevents the main pump 111 and the backup pump 124 from both pumping hydraulic fluid though the pilot flow path 135 at the same time.

The second solenoid valve 148 is provided to make sure that the main system 104 can still be isolated from the one or more consumers 110 in the event that the shuttle valve 146 fails. Accordingly, the second solenoid valve 148 provides a parallel connection between the main port 112 and the pilot flow path 135. The second solenoid valve 148 is located between the shuttle valve 146 and the pilot flow path 135 and is located between the first main fluid flow path 115 of the main circuit 114 and the pilot flow path 135. Therefore, in the event that the shuttle valve 146 fails and prevents fluid communication between the main port 112 and the pilot flow path 135, the main system 104 will still be able to provide pressure to the pilot operated shutoff valves 134, 136, and 150 through the second solenoid valve 148, while the backup system 108 may not be able to provide pressure to the pilot operated shutoff valves 134, 136, and 150 depending upon the type of failure in the shuttle valve 146. Therefore, in the event that the shuttle valve 146 fails and prevents fluid communication between the backup port 126 and the pilot flow path 135, the backup system 108 will not be able to provide pressure to the one or more consumers 110.

The second solenoid valve 148 in a spring biased position provides fluid communication between main port 112 and the pilot flow path 135 or between the backup port 126 and the pilot flow path 135 through the shuttle valve 146. The second solenoid valve 148 when actuated by receiving power from the electric power source 106 provides fluid communication between the between main port 112 and the pilot flow path 135 through the actuated first solenoid valve 138 and bypasses the shuttle valve 146.

In this embodiment of the hydraulic system section 102c, the main system 104 is isolated from the one or more consumers 110 by actuating the first solenoid valve 138 with power from the power source 106 to the first position and by pumping main hydraulic fluid through the main circuit 114 via the main pump 111 to the pilot flow path 135 through the shuttle valve 146 or through an actuated second solenoid valve 148 to actuate the first and second pilot operated shutoff valves 134 and 136 into their second positions and to actuate the third pilot operated shutoff valve 150. Further, in this embodiment of the hydraulic system section 102c, the main system 104 is isolated from the one or more consumers 110 by pumping backup hydraulic fluid through the backup circuit 118 via the backup pump 124 to the pilot flow path 135 through the shuttle valve 146 to actuate the first and second pilot operated shutoff valves 134 and 136 into their second positions and to actuate the third pilot operated shutoff valve 150.

Accordingly, in this embodiment, in the event of leak, the main system 104 can be isolated from the one or more consumers 110 by utilizing electric power from the power source 106 and pressure from the main system 104 or by utilizing pressure from the backup system 108. The flow of hydraulic fluid through section 102c in FIGS. 2, 3, 4, and 20 is illustrated by the flow arrows 154.

Figure 2:
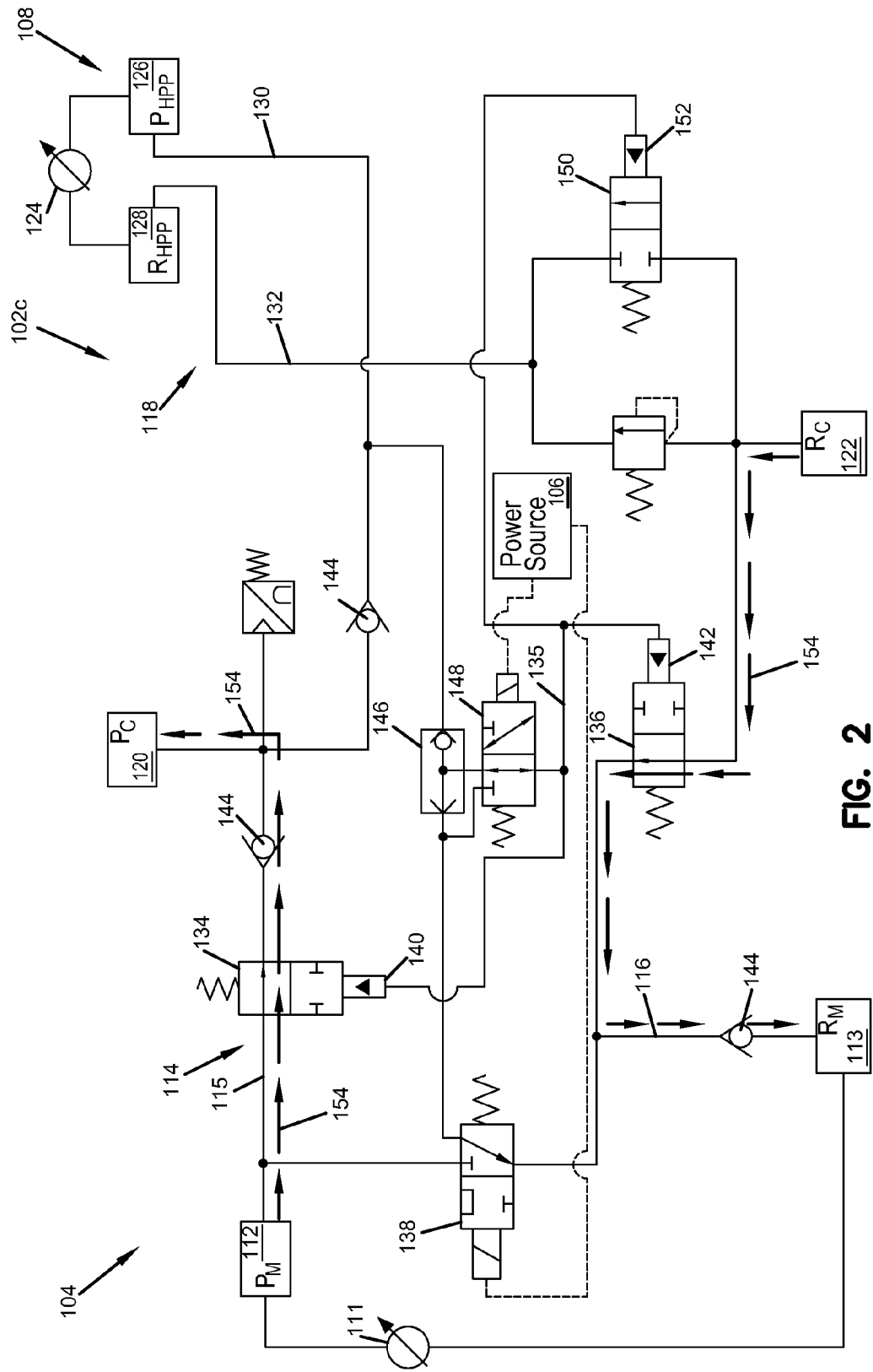
FIG. 2 illustrates an embodiment of a schematic of a hydraulic system section in a main mode of operation in accordance with the principles of the present disclosure.
Figure 3:
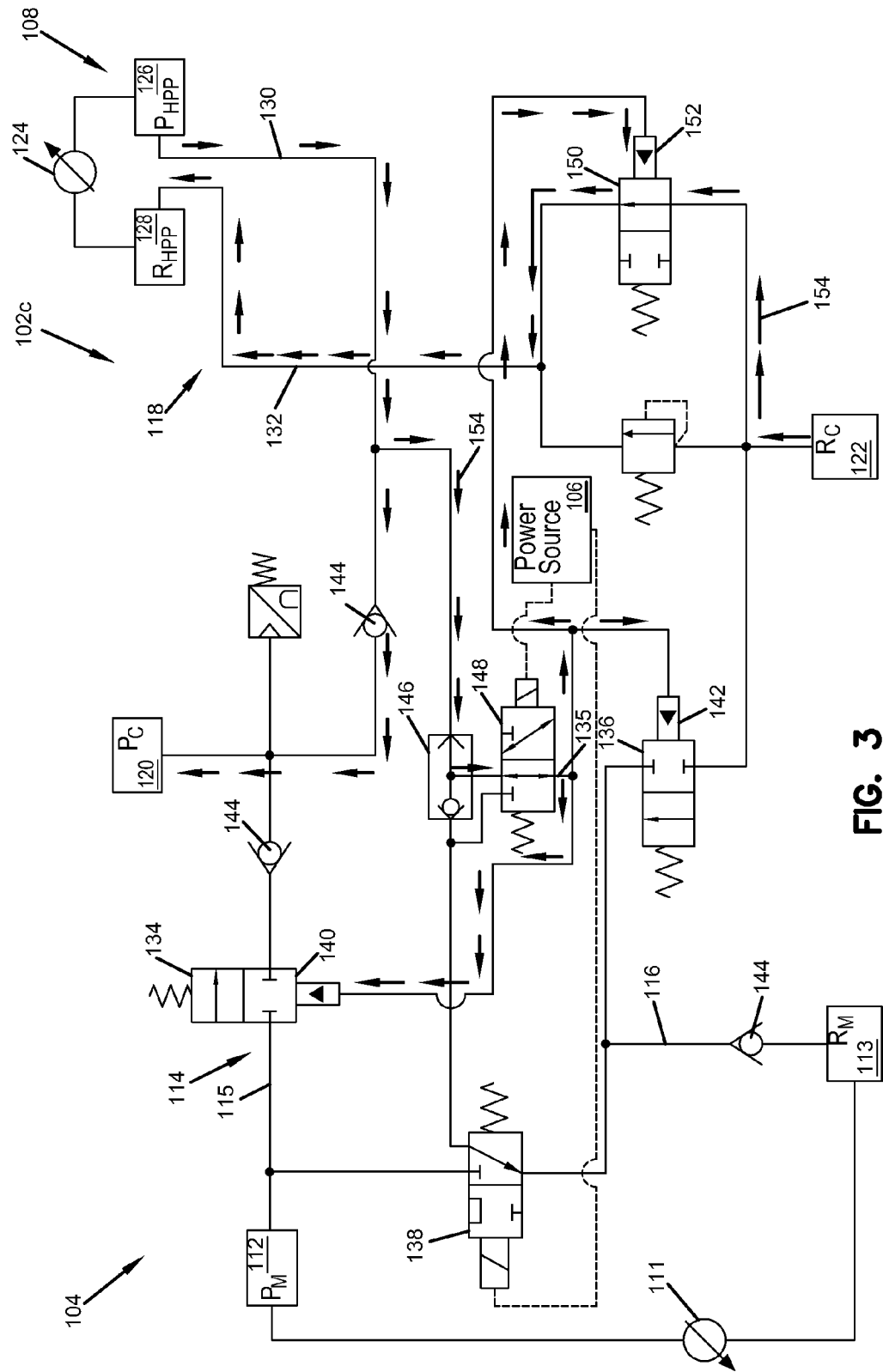
FIG. 3 illustrates an embodiment of a schematic of the hydraulic system section shown in FIG. 2 in a local mode of operation in accordance with the principles of the present disclosure.
Figure 4:
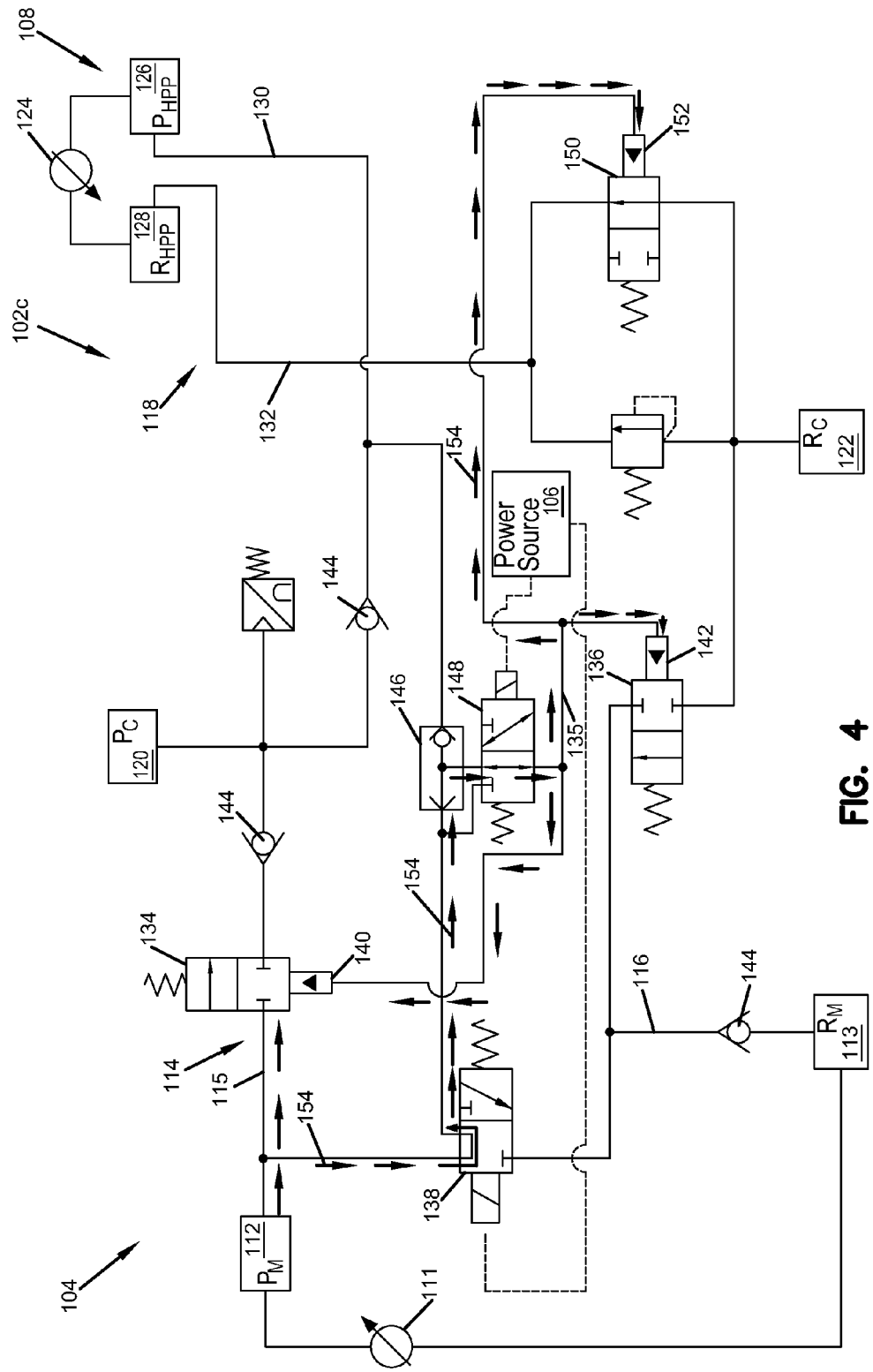
FIG. 4 illustrates an embodiment of a schematic of the hydraulic system section shown in FIGS. 2 and 3 in an isolation mode of operation in accordance with the principles of the present disclosure.
Figure 20:
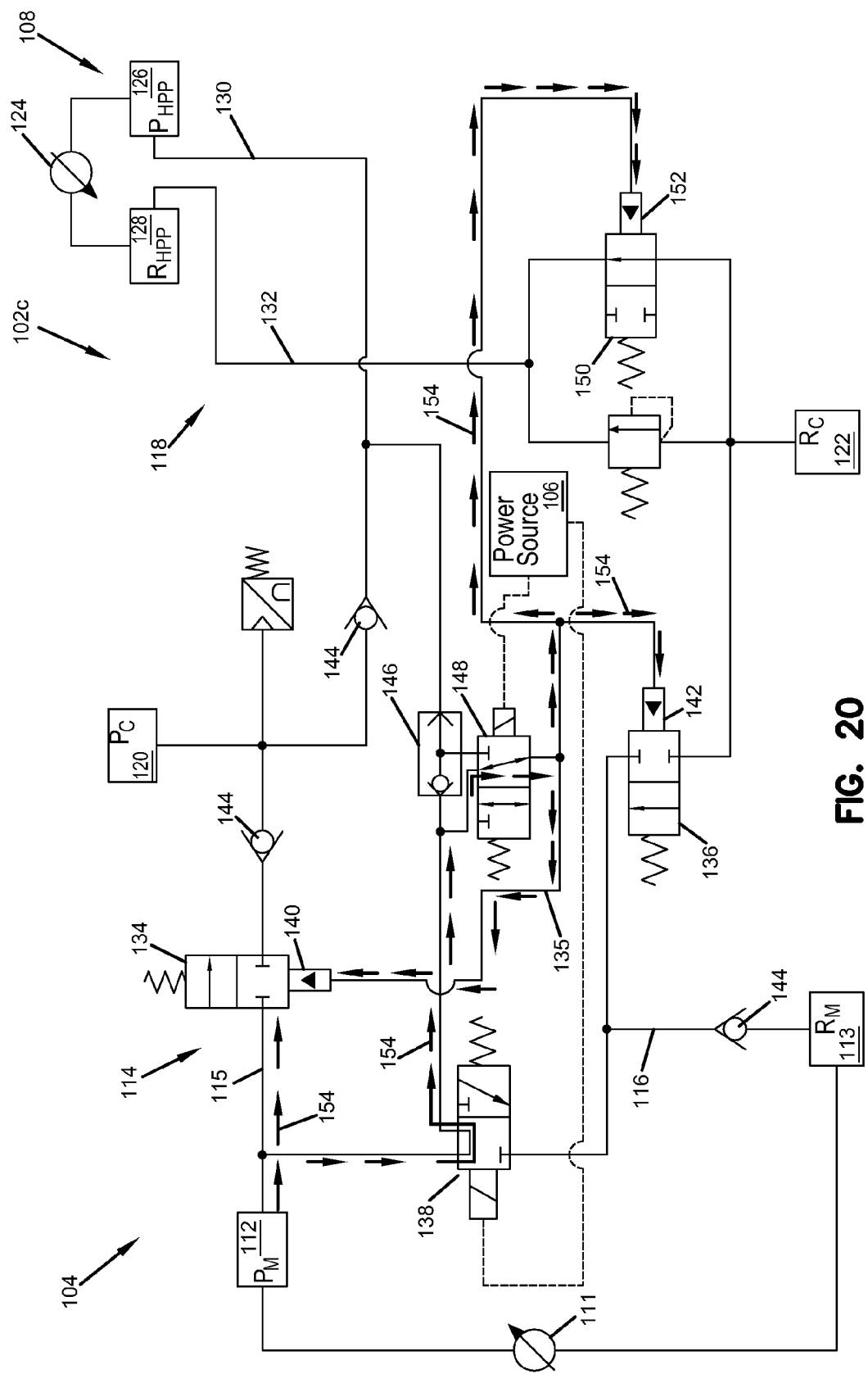
FIG. 20 illustrates an embodiment of a schematic of the hydraulic system section shown in FIGS. 2, 3, and 4 in an isolation mode of operation in accordance with the principles of the present disclosure.

Therefore, as illustrated in FIG. 2 in the main mode of operation, no valves are actuated. As illustrated in FIG. 3 in the backup mode of operation, the first and second pilot operated shutoff valves 134 and 136 are actuated into their second positions and the third pilot operated shutoff valve 150 is actuated. As illustrated in FIG. 4 in the isolation mode of operation, the first solenoid valve 138 is actuated into a first position, the first and second pilot operated shutoff valves 134 and 136 are actuated into their second positions, and the third pilot operated shutoff valve 150 is actuated. As illustrated in FIG. 20 in the isolation mode of operation when the shuttle valve 146 fails and prevents fluid communication between the main port 112 and the pilot flow path 135, the first solenoid valve 138 is actuated into a first position, the second solenoid valve 148 is actuated to provide fluid communication between the main port 112 and the pilot flow path 135 downstream of the first solenoid valve 138, the first and second pilot operated shutoff valves 134 and 136 are actuated into their second positions, and the third pilot operated shutoff valve 150 is actuated.

Figure 5:
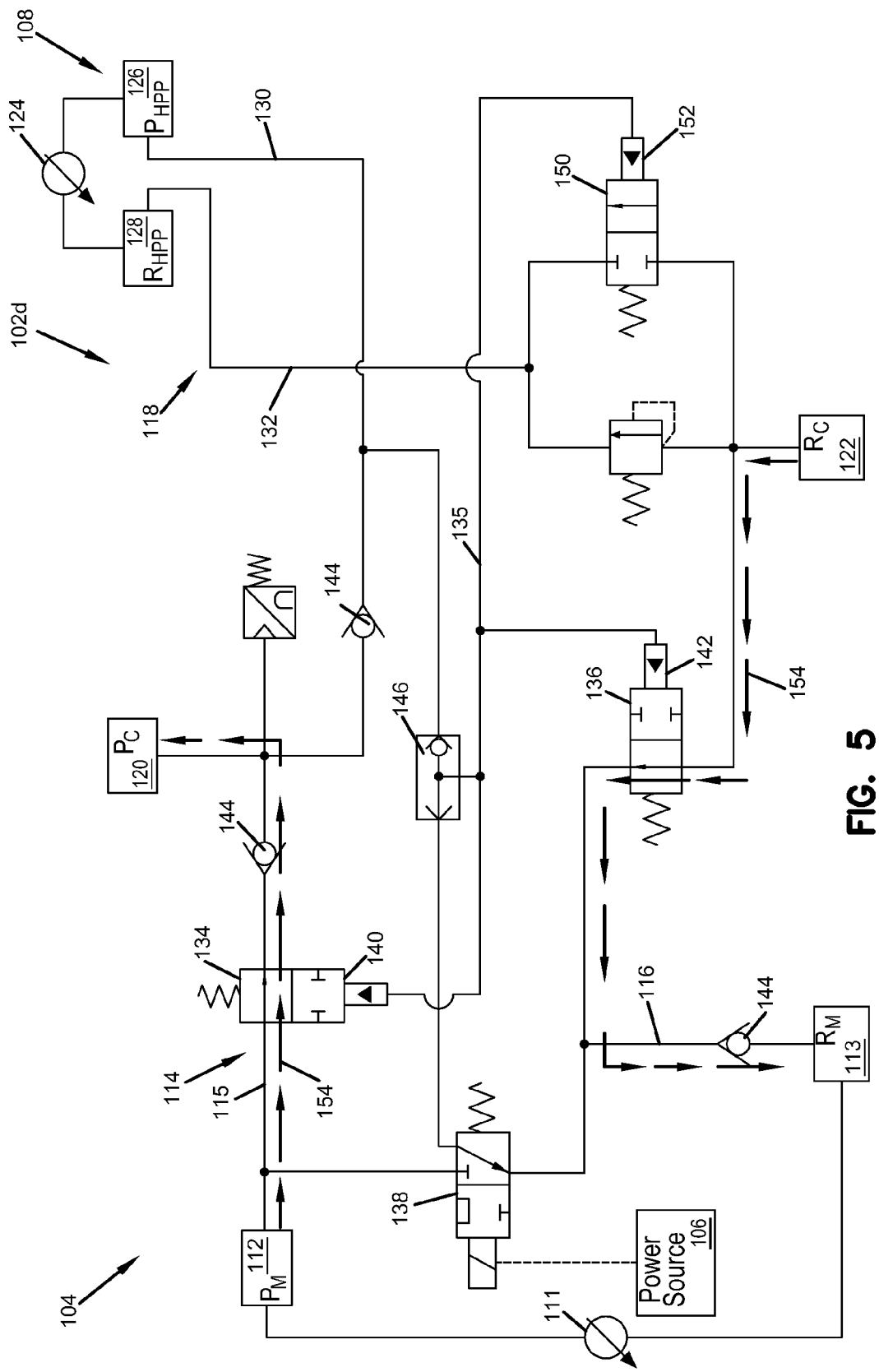
FIG. 5 illustrates an embodiment of a schematic of a hydraulic system section in a main mode of operation in accordance with the principles of the present disclosure.
Figure 6:
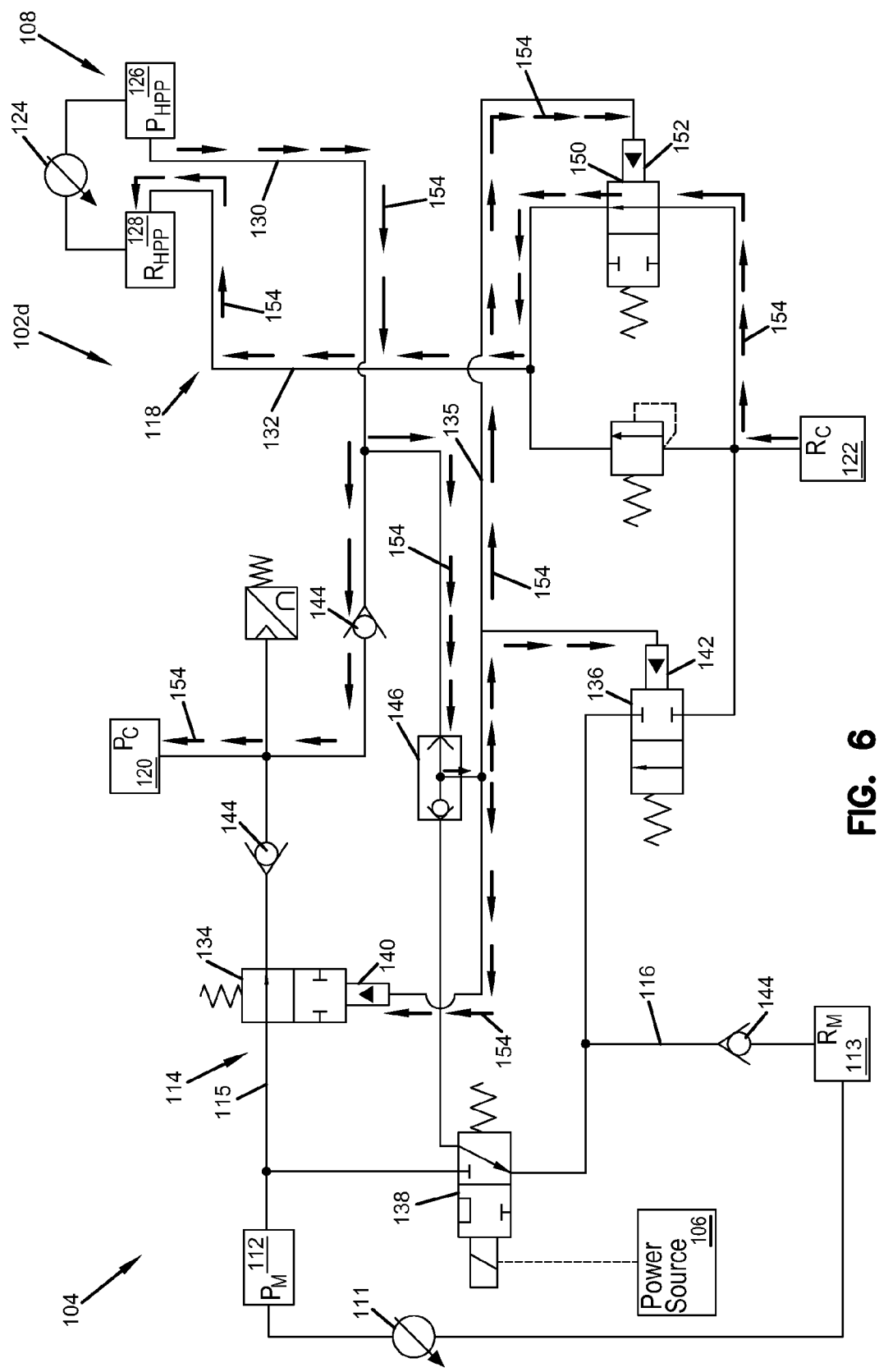
FIG. 6 illustrates an embodiment of a schematic of the hydraulic system section shown in FIG. 5 in a local mode of operation in accordance with the principles of the present disclosure.
Figure 7:
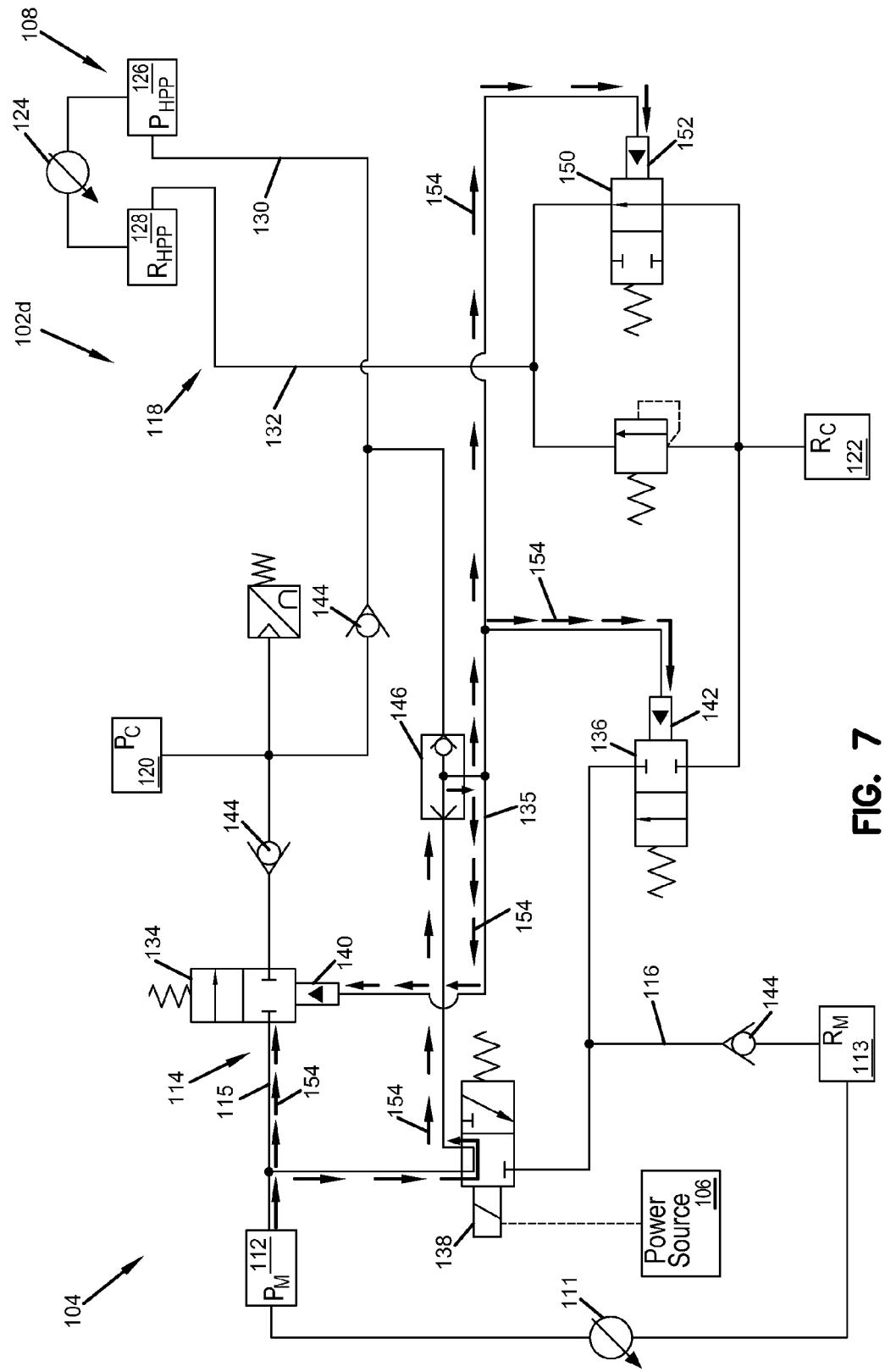
FIG. 7 illustrates an embodiment of a schematic of the hydraulic system section shown in FIGS. 6 and 7 in an isolation mode of operation in accordance with the principles of the present disclosure.

Referring to FIGS. 5-7, an embodiment of a of a hydraulic system section 102d in a main mode, a backup mode, and an isolation mode of operation in accordance with the principles of the present disclosure are illustrated. This embodiment of the hydraulic system section 102d is similar to the embodiment of the hydraulic system section 102c illustrated in FIGS. 2-4 and 20 except that the hydraulic system section 102c does not include a second solenoid valve 148. Accordingly, the hydraulic system section 102d illustrated in FIGS. 5-7 functions identically to the hydraulic system section 102c as shown in FIGS. 2-4 and 20 except that the hydraulic system section 102d is not capable of isolating the main system 104 from the one or more consumers 110 in the event that the shuttle valve 146 fails and prevents fluid communication between the main port 112 and the consumer port 120.

Figure 8:
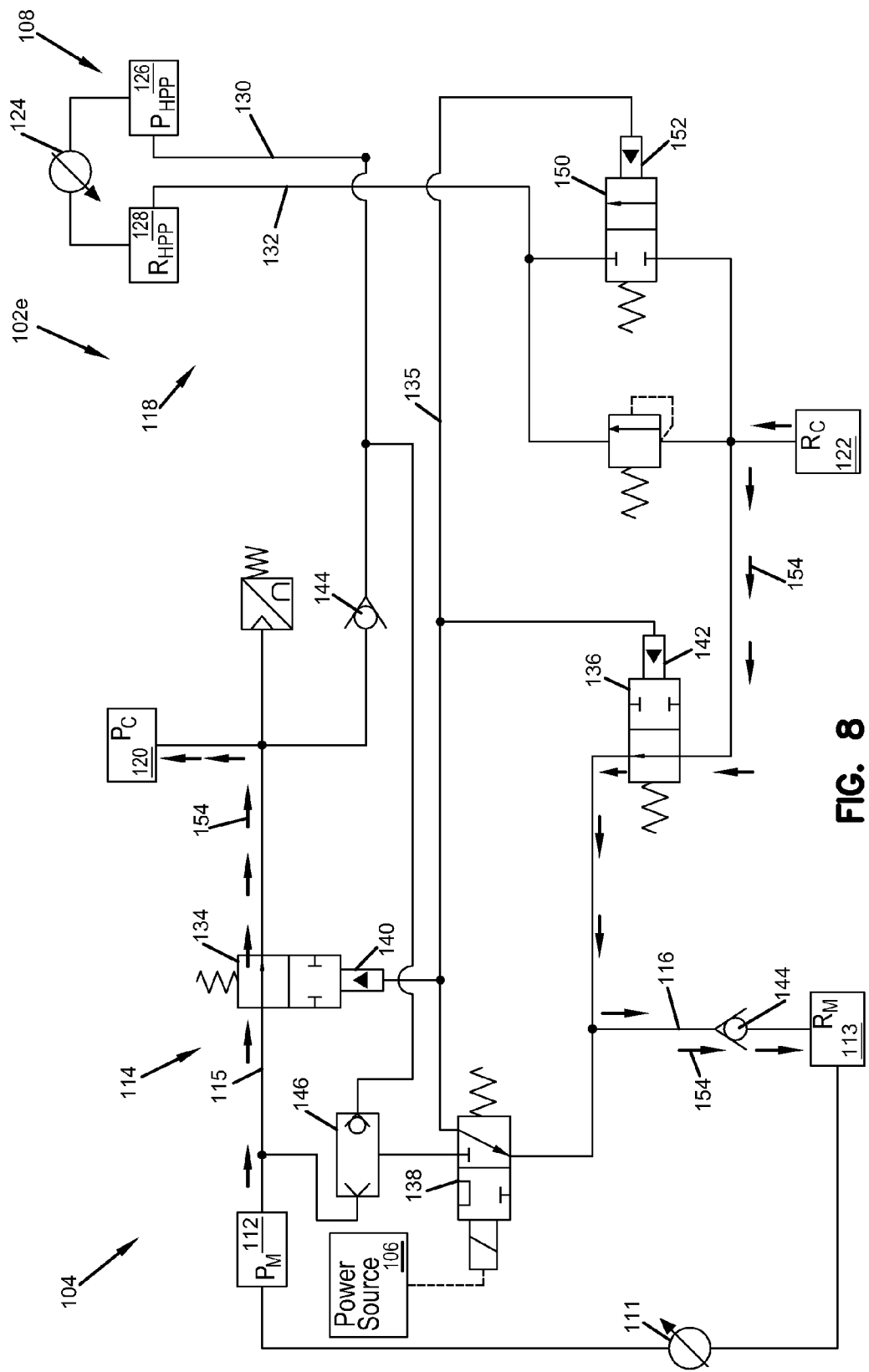
FIG. 8 illustrates an embodiment of a schematic of a hydraulic system section in a main mode of operation in accordance with the principles of the present disclosure.
Figure 9:
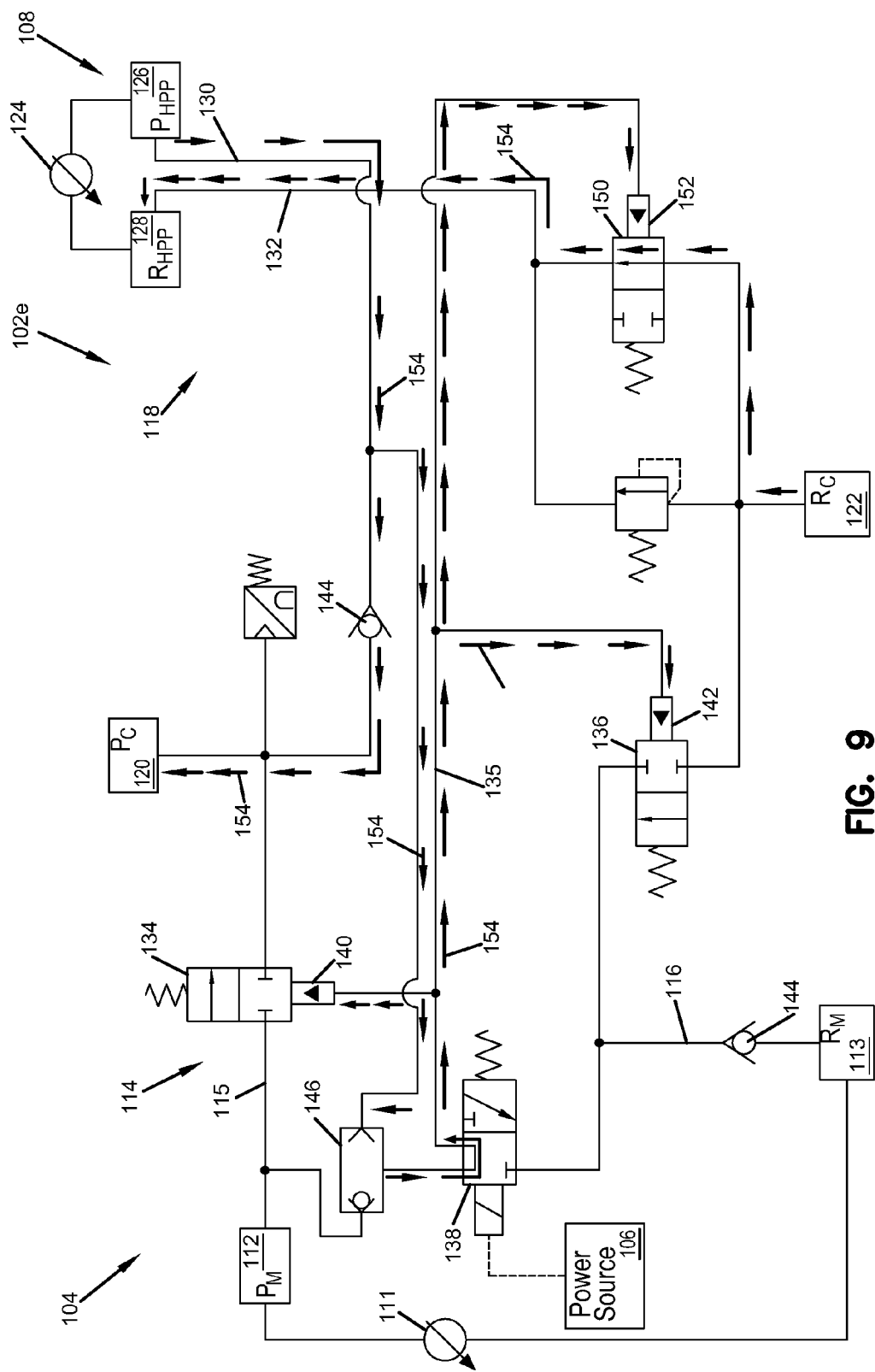
FIG. 9 illustrates an embodiment of a schematic of the hydraulic system section shown in FIG. 8 in a local mode of operation in accordance with the principles of the present disclosure.
Figure 10:
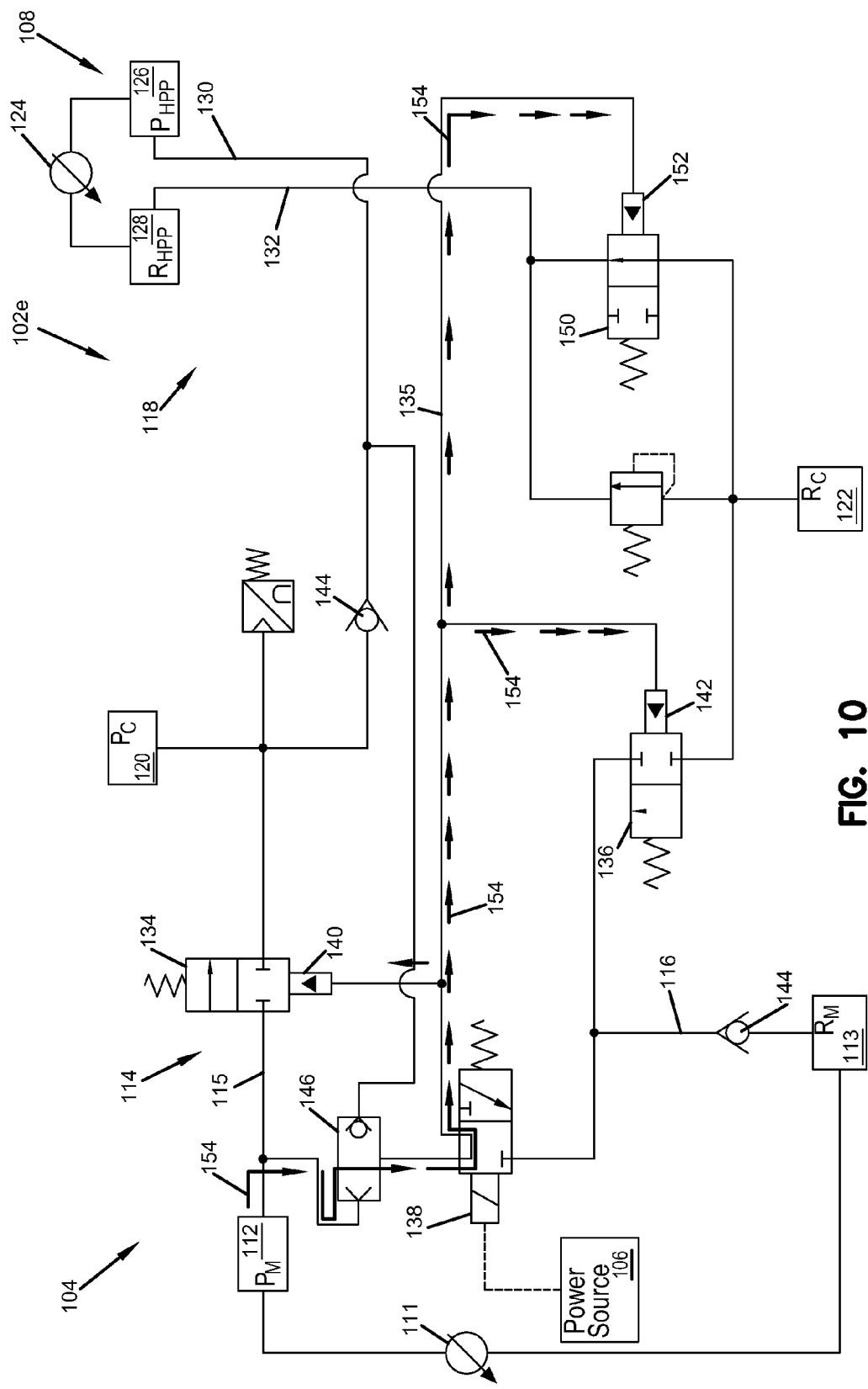
FIG. 10 illustrates an embodiment of a schematic of the hydraulic system section shown in FIGS. 8 and 9 in an isolation mode of operation in accordance with the principles of the present disclosure.

Referring to FIGS. 8-10, an embodiment of a hydraulic system section 102e in a main mode, a backup mode, and an isolation mode of operation in accordance with the principles of the present disclosure are illustrated. In this embodiment of the hydraulic system section 102e, the first solenoid valve 138 is spring biased into a second position and the first and second pilot operated shutoff valves 134, 136 are spring biased into a first position. In this embodiment, the hydraulic system section 102e further includes two one-way valves 144, a third pilot operated shutoff valve 150 including a third pilot port 152, and a flow path valve 146.

The third pilot operated shutoff valve 150 is located on the second backup flow path 132 of second circuit 118 between the consumer return port 122 and the backup return port 128. The third pilot port 152 on the third pilot operated shutoff valve 150 is located on the pilot flow path 135 adjacent to the second pilot port 142. The third pilot operated shutoff valve 150 in hydraulic system section 102e prevents fluid communication between the consumer return port 122 and the backup return port 128 when the third pilot operated shutoff valve 150 is in a spring biased position. The third pilot operated shutoff valve 150 in hydraulic system section 102e provides fluid communication between the consumer return port 122 and the backup return port 128 when the third pilot operated shutoff valve 150 is in an actuated position.

The one-way valves 144 may include check valves. The first one-way valve 144 is located on the first backup fluid flow path 130 of the backup circuit 118 between the backup port 126 and the consumer port 120. The first one-way valve 144 only allows hydraulic fluid to flow from the backup port 126 to the consumer port 120 and prevents flow of hydraulic fluid in the opposite direction. The second one-way valve 144 is located on the second main fluid flow path 116 between the main return port 113 and the second pilot operated shutoff valve 136. The second one-way valve 144 only allows hydraulic fluid to flow from the consumer return port 122 to the main return port 113 and prevents the hydraulic fluid from flowing in the opposite direction.

The flow path valve 146 in this embodiment is a shuttle valve. In some embodiments, the shuttle valve 146 is a two-way valve. In this embodiment, the flow path valve 146 is located on the first main fluid flow path 115 of the first circuit 114 between the main port 112 and the pilot flow path 135 and is located on the first backup fluid flow path 130 of the second circuit 118 between the backup port 126 and the pilot flow path 135. The flow path valve 146 in a first position provides fluid communication between the main port 112 and the pilot flow path 135 while further preventing fluid communication between the backup port 126 and the pilot flow path 135. The flow path valve 146 in a second position provides fluid communication between the backup port 126 and the pilot flow path 135 while further preventing fluid communication between the main port 112 and the pilot flow path 135. Accordingly, the flow path valve 146 prevents the main pump 111 and the backup pump 124 from both pumping hydraulic fluid though the pilot flow path 135 at the same time.

In hydraulic system section 102e, the first solenoid valve 138 is located downstream of the flow path valve 146. Accordingly, the first solenoid valve 138 in section 102e is additionally located on the pilot flow path 135 between the backup port 126 and the first, second, and third pilot ports 140, 142, and 152 of the first, second, and third pilot operated shutoff valves 134, 136, and 150. The first position of the flow path valve 146 further provides fluid communication between the backup port 126 and the first, second, and third pilot ports 140, 142, and 152. When the first solenoid valve 138 is in the first position and the backup pump 124 is pumping main hydraulic fluid though the backup circuit 118, the first, second, and third pilot ports 140, 142, and 152 receive backup hydraulic fluid or pressure actuating the first, second, and third pilot operated shutoff valves 134, 136 and 150. The first solenoid valve 138 in a second position further prevents fluid communication between the backup port 126 and the first, second, and third pilot ports 140, 142, and 152. Therefore, when the first solenoid valve 138 is in the second position or if the main pump 111 and the backup pump 124 is not pumping hydraulic fluid though the first main fluid flow path 115 or through the first backup fluid flow path 130, then the first, second, and third pilot ports 140, 142, and 152 do not receive main hydraulic fluid or pressure and do not actuate the first, second, and their pilot operated shutoff valves 134, 136, and 150. Accordingly, the first, second, and third pilot operated shutoff valves 134, 136, and 150 remain in a spring biased position when the first solenoid valve 138 is in the second position or if the main pump 111 and the backup pump 124 are not pumping hydraulic fluid though the main circuit 114 and the backup circuit 118.

In this embodiment of the hydraulic system section 102e, the main system 104 is isolated from the one or more consumers 110 by actuating the first solenoid valve 138 with power from the electric power source 106 to the first position and by pumping main hydraulic fluid through the main circuit 114 via the main pump 111 to the pilot flow path 135 through the shuttle valve 146 to actuate the first and second pilot operated shutoff valves 134 and 136 into their second positions and to actuate the third pilot operated shutoff valve 150. Further, in this embodiment of the hydraulic system section 102e, the main system 104 is isolated from the one or more consumers 110 by actuating the first solenoid valve 138 with power from the power source 106 to the first position and by pumping backup hydraulic fluid through the backup circuit 118 via the backup pump 124 to the pilot flow path 135 through the shuttle valve 146 to actuate the first and second pilot operated shutoff valves 134 and 136 into their second positions and to actuate the third pilot operated shutoff valve 150.

Accordingly, in this embodiment, in the event of leak, the main system 104 can be isolated from the one or more consumers 110 by utilizing power from the power source 106 and pressure from the main system 104 or by utilizing power from the power source 106 and pressure from the backup system 108. The flow of hydraulic fluid through section 102c in FIGS. 8-10 is illustrated by the flow arrows 154.

Therefore, as illustrated in FIG. 8 in the main mode of operation, no valves are actuated. As illustrated in FIG. 9 in the backup mode of operation, the first solenoid valve 138 is actuated into a first position, the first and second pilot operated shutoff valves 134 and 136 are actuated into their second positions, and the third pilot operated shutoff valve 150 is actuated. As illustrated in FIG. 10 in the isolation mode of operation, the first solenoid valve 138 is actuated in a first position, the first and second pilot operated shutoff valves 134 and 136 are actuated into their second positions, and the third pilot operated shutoff valve 150 is actuated.

Figure 11:
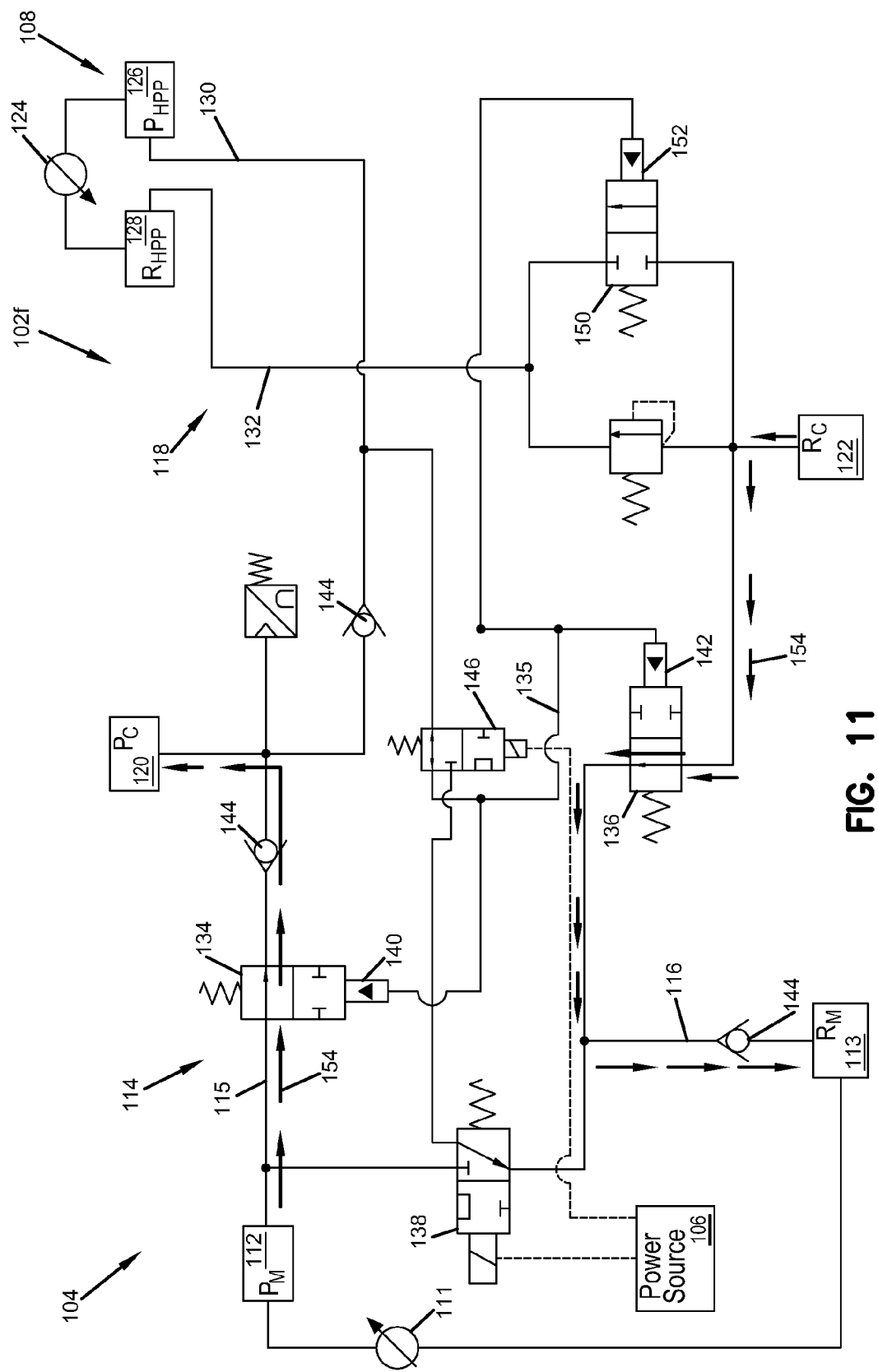
FIG. 11 illustrates an embodiment of a schematic of a hydraulic system section in a main mode of operation in accordance with the principles of the present disclosure.
Figure 12:
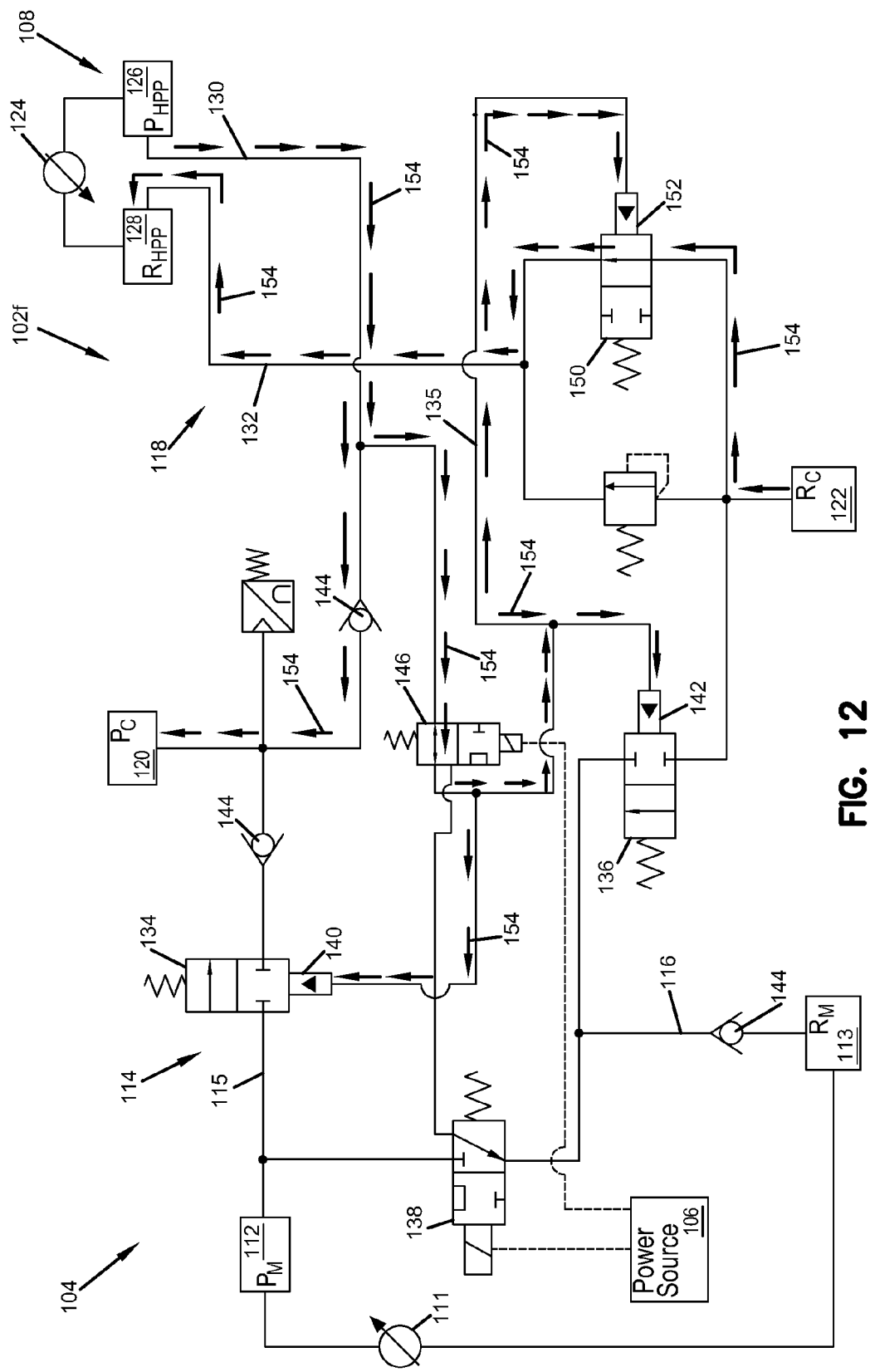
FIG. 12 illustrates an embodiment of a schematic of the hydraulic system section shown in FIG. 11 in a local mode of operation in accordance with the principles of the present disclosure.
Figure 13:
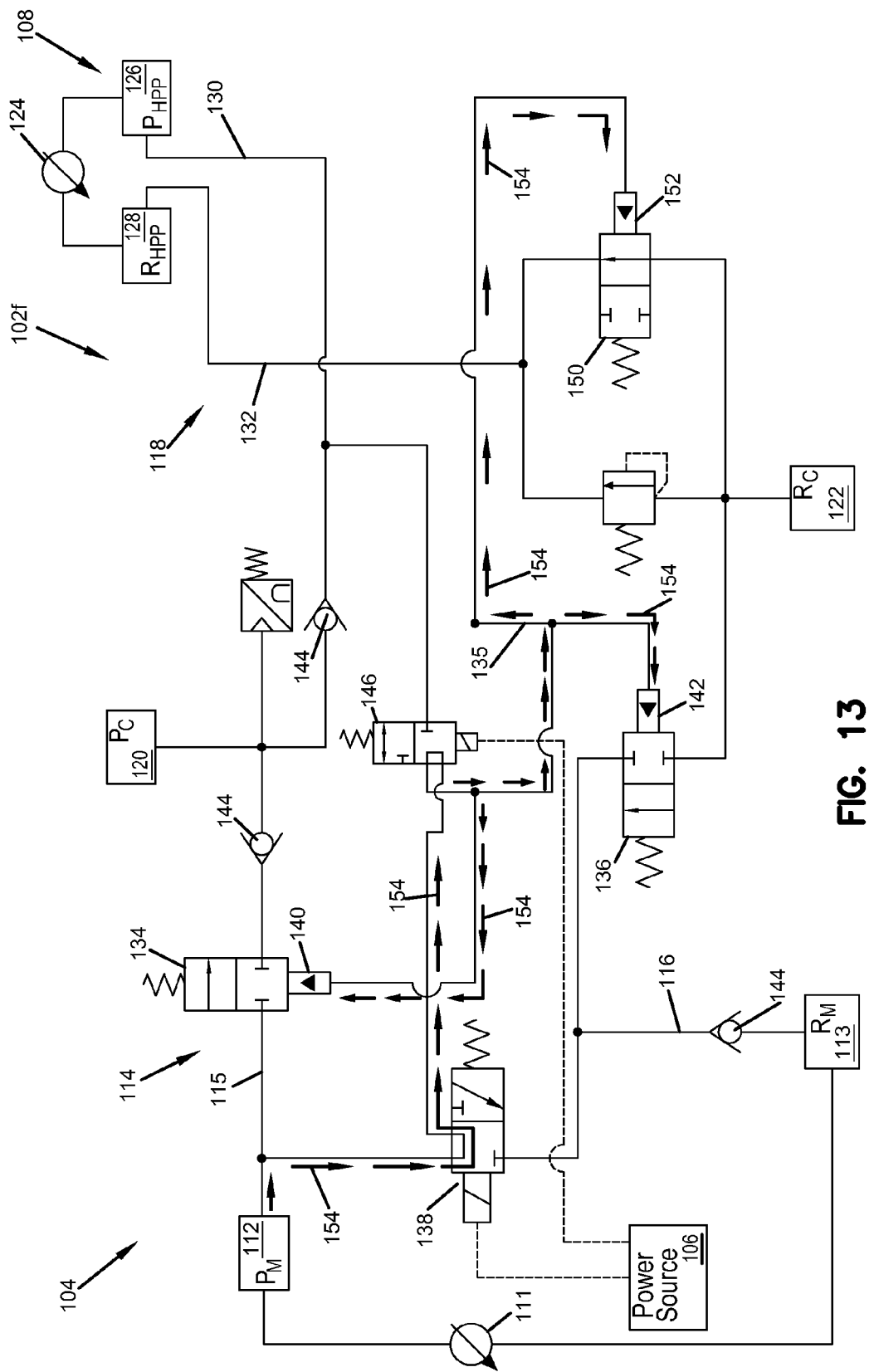
FIG. 13 is an embodiment of a schematic of the hydraulic system section shown in FIGS. 11 and 12 in an isolation mode of operation in accordance with the principles of the present disclosure.

Referring to FIGS. 11-13, an embodiment of a of a hydraulic system section 102f in a main mode, a backup mode, and an isolation mode of operation in accordance with the principles of the present disclosure are illustrated. This embodiment of the hydraulic system section 102f is similar to the embodiment of the hydraulic system section 102d illustrated in FIGS. 5-7 except that the flow path valve 146 in hydraulic system section 102f is a second solenoid valve 146 instead of a shuttle valve. The second solenoid valve 146 provides fluid communication between the backup port 126 and the pilot flow path 135 in the spring biased position and prevents fluid communication between the main port 112 and the pilot flow path 135. The second solenoid valve 146 provides fluid communication between the main port 112 and the pilot flow path 135 when in an actuated position by power from a power source 106 and prevents fluid communication between the backup port 126 and the pilot flow path 135 Accordingly, the hydraulic system section 102f illustrated in FIGS. 11-13 functions identically to the hydraulic system section 102d shown in FIGS. 5-7 except that the second solenoid valve 146 must be actuated by power from a power source 106 to provide fluid communication between the main port 112 and pilot flow path 135 instead of moving the valve in the shuttle valve 146 with hydraulic pressure as utilized by the hydraulic system section 102d.

Figure 14:
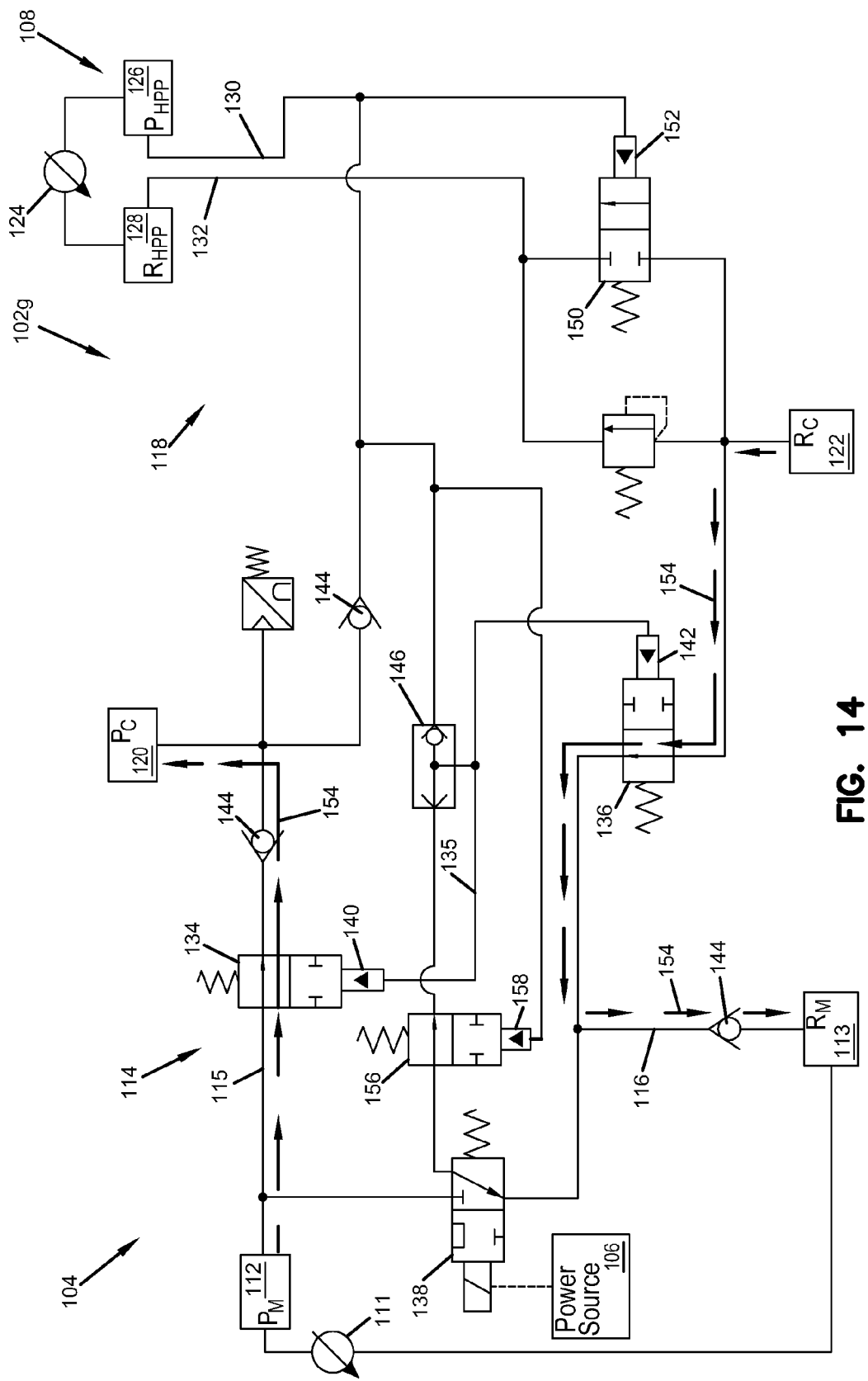
FIG. 14 illustrates an embodiment of a schematic of a hydraulic system section in a main mode of operation in accordance with the principles of the present disclosure.
Figure 15:
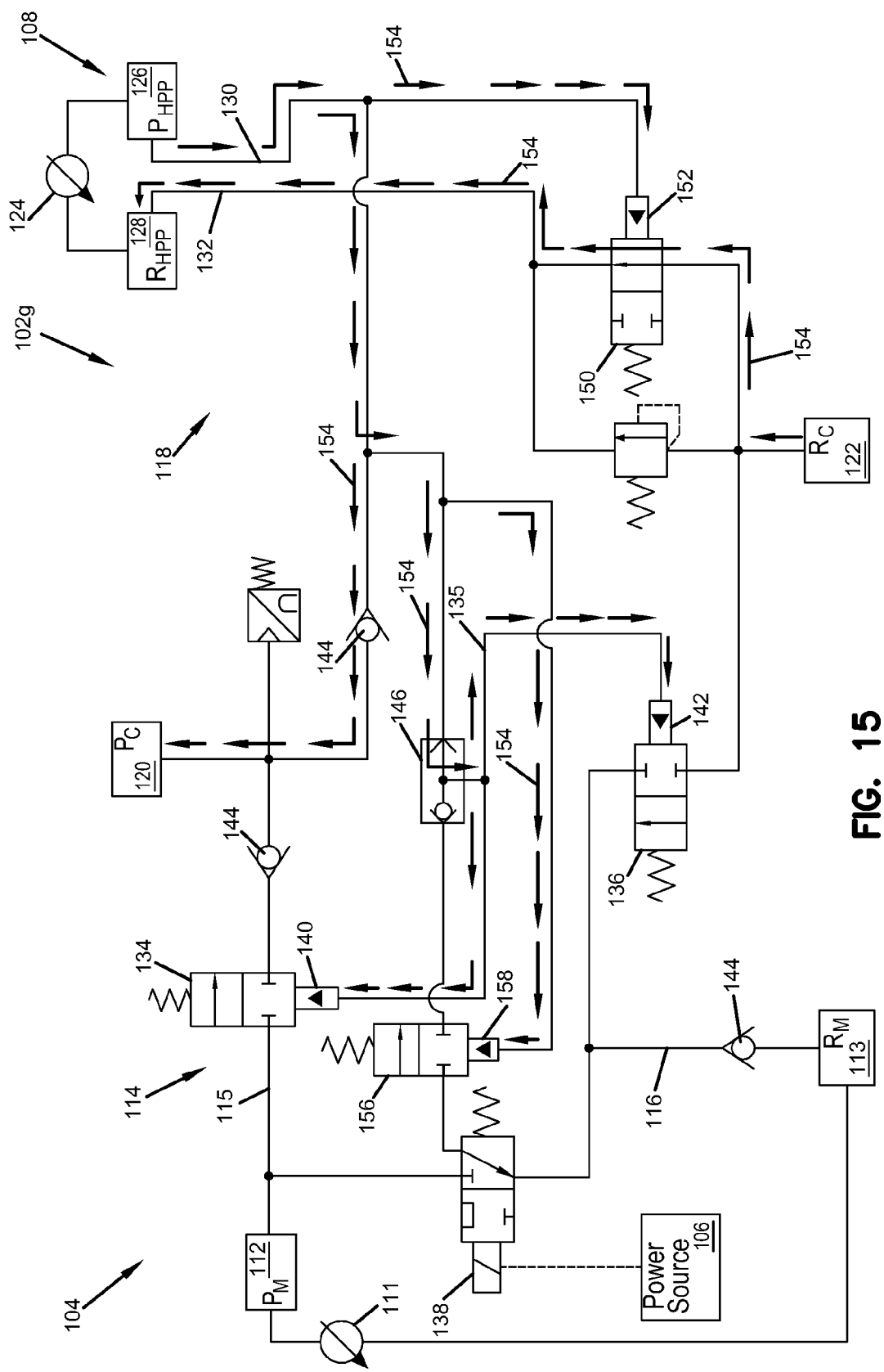
FIG. 15 illustrates an embodiment of a schematic of the hydraulic system section shown in FIG. 14 in a local mode of operation in accordance with the principles of the present disclosure.
Figure 16:
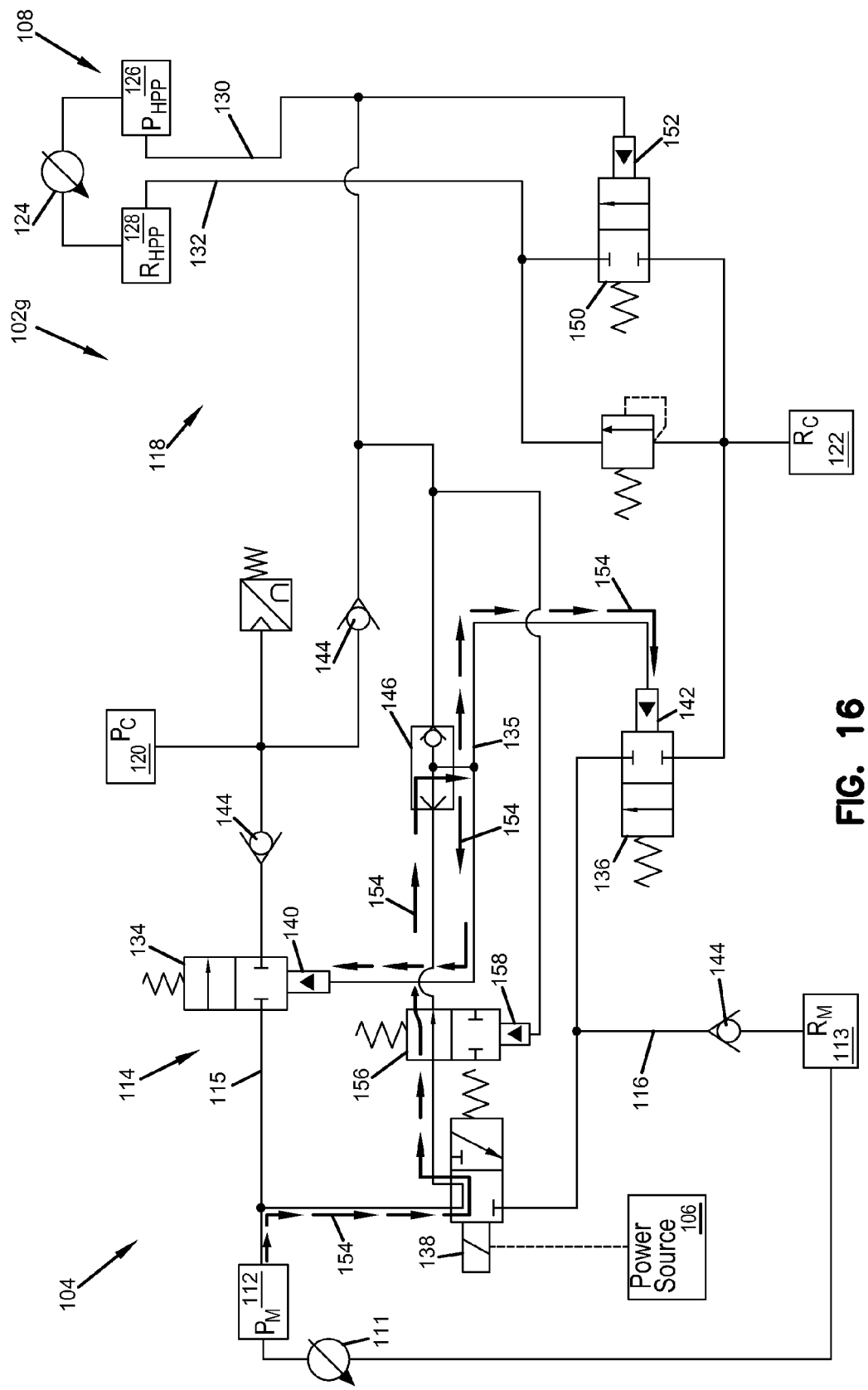
FIG. 16 illustrates an embodiment of a schematic of the hydraulic system section shown in FIGS. 14 and 15 in an isolation mode of operation in accordance with the principles of the present disclosure.

Referring to FIGS. 14-16, an embodiment of a of a hydraulic system section 102g in a main mode, a backup mode, and an isolation mode of operation in accordance with the principles of the present disclosure are illustrated. In this embodiment of the hydraulic system section 102g, the first solenoid valve 138 is spring biased into a second position and the first and second pilot operated shutoff valves 134, 136 are spring biased into a first position. In this embodiment, the hydraulic system section 102c further includes three one-way valves 144, a third pilot operated shutoff valve 150 including a third pilot port 152, a fourth pilot operated shutoff valve 156 with a fourth pilot port 158, and a flow path valve 146.

The third pilot operated shutoff valve 150 is located on the second backup fluid flow path 132 of the second backup fluid flow path 132 between the consumer return port 122 and the backup return port 128. The third pilot port 152 on the third pilot operated shutoff valve 150 is located on the first backup fluid flow path 130 on the backup circuit 118 adjacent to the backup port 126. The third pilot operated shutoff valve 150 in hydraulic system section 102g prevents fluid communication between the consumer return port 122 and the backup return port 128 when the third pilot operated shutoff valve 150 is in a spring biased position. The third pilot operated shutoff valve 150 in hydraulic system section 102g provides fluid communication between the consumer return port 122 and the backup return port 128 when the third pilot operated shutoff valve 150 is in an actuated position.

The one-way valves 144 may be check valves. The first one-way valve 144 is located on the first main fluid flow path 115 of the main circuit 114 between the main port 112 and the consumer port 120. The first one-way valve 144 only allows hydraulic fluid to flow from the main port 112 to the consumer port 120 and prevents flow of hydraulic fluid in the opposite direction.

The second one-way valve 144 is located on the first backup fluid flow path 130 of the backup circuit 118 between the backup port 126 and the consumer port 120. The second one-way valve 144 only allows hydraulic fluid to flow from the backup port 126 to the consumer port 120 and prevents flow of hydraulic fluid in the opposite direction.

The third one-way valve 144 is located on the second main fluid flow path 116 between the main return port 113 and the second pilot operated shutoff valve 136. The third one-way valve 144 only allows hydraulic fluid to flow from the consumer return port 122 to the main return port 113 and prevents the hydraulic fluid from flowing in the opposite direction.

The one-way valves 144 as illustrated herein are exemplary only. Several different configurations of one or multiple one-wavy valves 144 may be utilized in any of the sections 102 discussed above as would be suitable for the desired flow of hydraulic fluid through the sections 102 as known by a person of skill in the art. Accordingly, the positioning of the one-way valves 144 in the any of the sections 102 discussed above is not limiting.

The flow path valve 146 in this embodiment is a shuttle valve. In some embodiments, the shuttle valve 146 is a two-way valve. The flow path valve 146 is located on first main fluid flow path 115 of the first circuit 114 between the main port 112 and the pilot flow path 135 and is located on the first backup fluid flow path 130 of the second circuit 118 between the backup port 126 and the pilot flow path 135. The flow path valve 146 in a first position provides fluid communication between the main port 112 and the pilot flow path 135 while further preventing fluid communication between the backup port 126 and the pilot flow path 135. The flow path valve 146 in a second position provides fluid communication between the backup port 126 and the pilot flow path 135 while further preventing fluid communication between the main port 112 and the pilot flow path 135. Accordingly, the flow path valve 146 prevents the main pump 111 and the backup pump 124 from both pumping hydraulic fluid though the pilot flow path 135 at the same time.

The fourth pilot operated shutoff valve 156 is another mechanism for isolating the main circuit 114 from the one or more consumers 110. The fourth pilot operated shutoff valve 156 is located on the first main fluid flow path 115 of the main circuit 114 between the shuttle valve 146 and the first solenoid valve 138. The fourth pilot operated shutoff valve 156 includes a fourth pilot port 158. The fourth pilot port 158 is located on the first backup fluid flow path 130 on the backup circuit 118. Accordingly, the fourth pilot operated shutoff valve 156 is actuated when the backup pump 124 pumps backup fluid though the backup port 126 and the first backup fluid flow path 130 on the backup circuit 118.

The fourth pilot operated shutoff valve 156 in a spring biased position provides fluid communication between main port 112 and the pilot flow path 135 when the first solenoid valve 138 is actuated by power from a power source 106. The fourth pilot operated shutoff valve 156 in the actuated position prevents fluid communication between the main port 112 and the pilot flow path 135 when the first solenoid valve 138 is actuated by receiving power from the power source 106.

In this embodiment of the hydraulic system section 102g, the main system 104 is isolated from the one or more consumers 110 by actuating the first solenoid valve 138 with power from the power source 106 to the second position and by pumping main hydraulic fluid through the main circuit 114 via the main pump 111 to the pilot flow path 135 to actuate the first and second pilot operated shutoff valves 134 and 136 into their second positions. Further, in this embodiment of the hydraulic system section 102g, the main system 104 is isolated from the one or more consumers 110 by pumping backup hydraulic fluid through the backup circuit 118 via the backup pump 124 to the pilot flow path 135 to actuate the first and second pilot operated shutoff valves 134 and 136 into their second positions and by pumping backup fluid through the first backup fluid flow path 130 to the third and fourth pilot ports 152 and 158 to actuate the third and fourth pilot operated shutoff valves 150 and 156.

Accordingly, in this embodiment, in the event of leak, the main system 104 can be isolated from the one or more consumers 110 by utilizing power from the power source 106 and pressure from the main system 104 or by utilizing pressure from the backup system 108. The flow of hydraulic fluid through section 102g in FIGS. 14-16 is illustrated by the flow arrows 154.

Therefore, as illustrated in FIG. 14 in the main mode of operation, no valves are actuated. As illustrated in FIG. 15 in the backup mode of operation, third and fourth pilot operated shutoff valves 150 and 156 are actuated and the first and second pilot operated shutoff valves 134 and 136 are actuated into their second positions. As illustrated in FIG. 16 in the isolation mode of operation, the first solenoid valve 138 is actuated into a first position and the first and second pilot operated shutoff valves 134 and 136 are actuated into their second positions.

Figure 17:
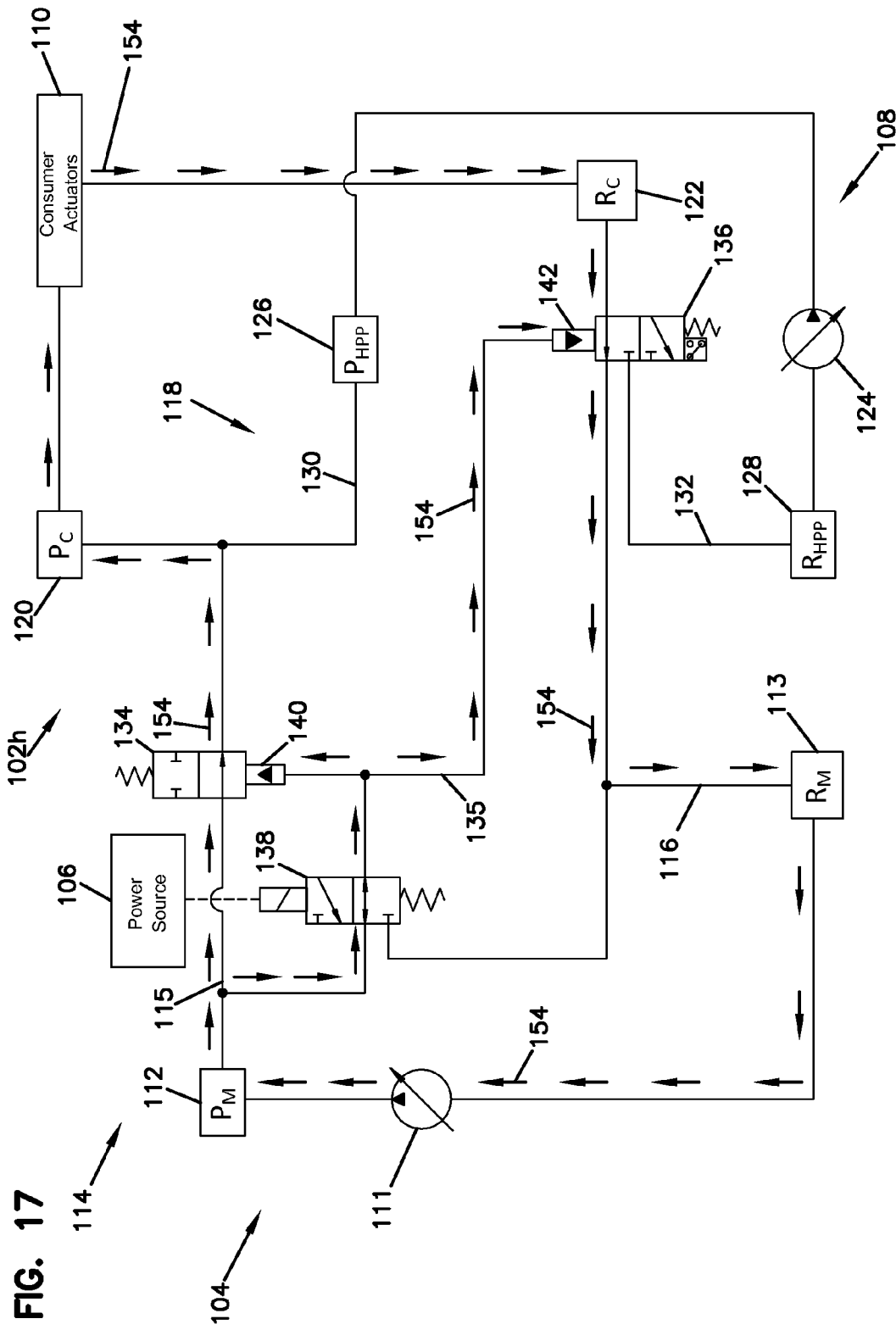
FIG. 17 illustrates an embodiment of a schematic of a hydraulic system section in a main mode of operation in accordance with the principles of the present disclosure.
Figure 18:
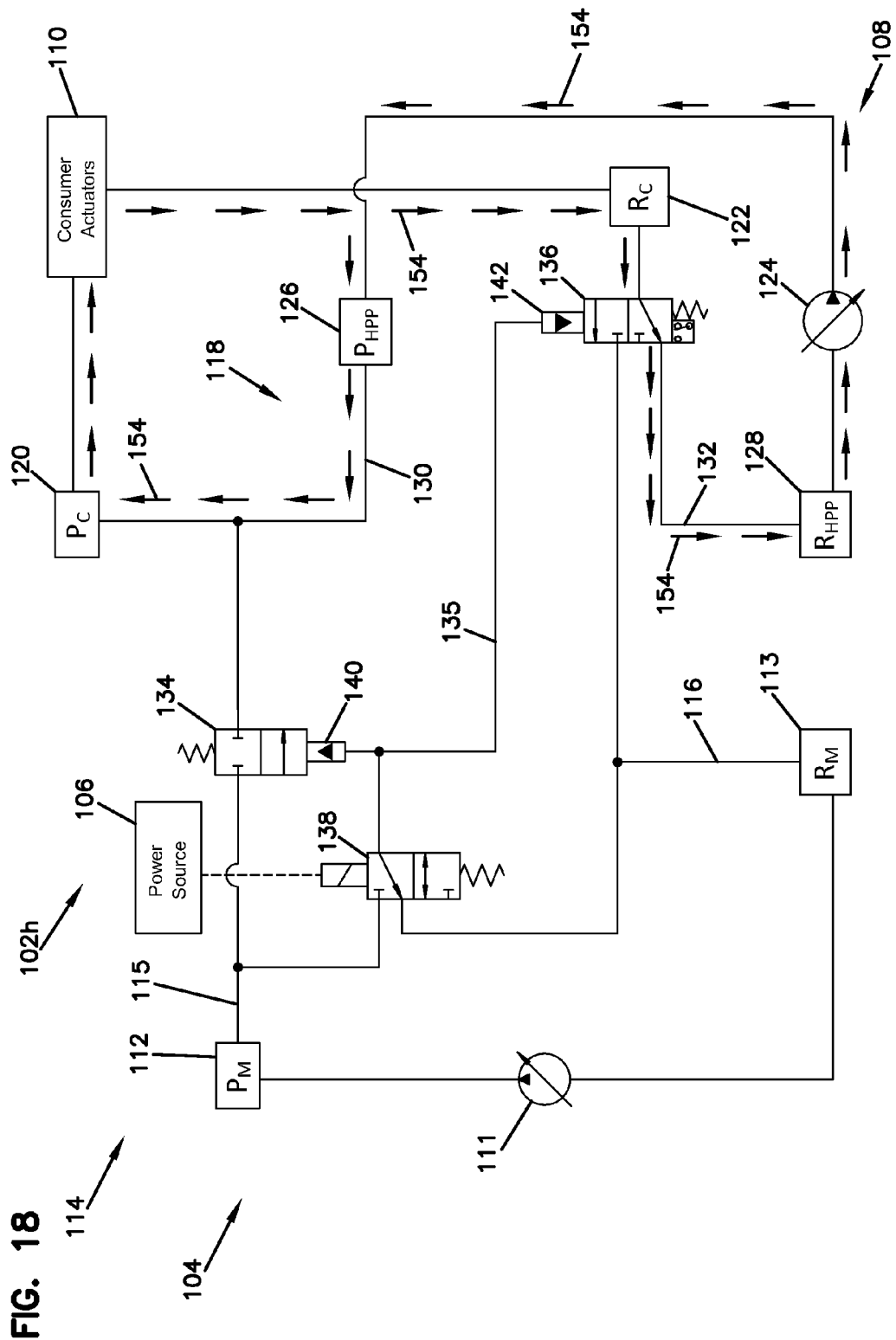
FIG. 18 illustrates an embodiment of a schematic of the hydraulic system section shown in FIG. 17 in a local mode of operation in accordance with the principles of the present disclosure.
Figure 19:
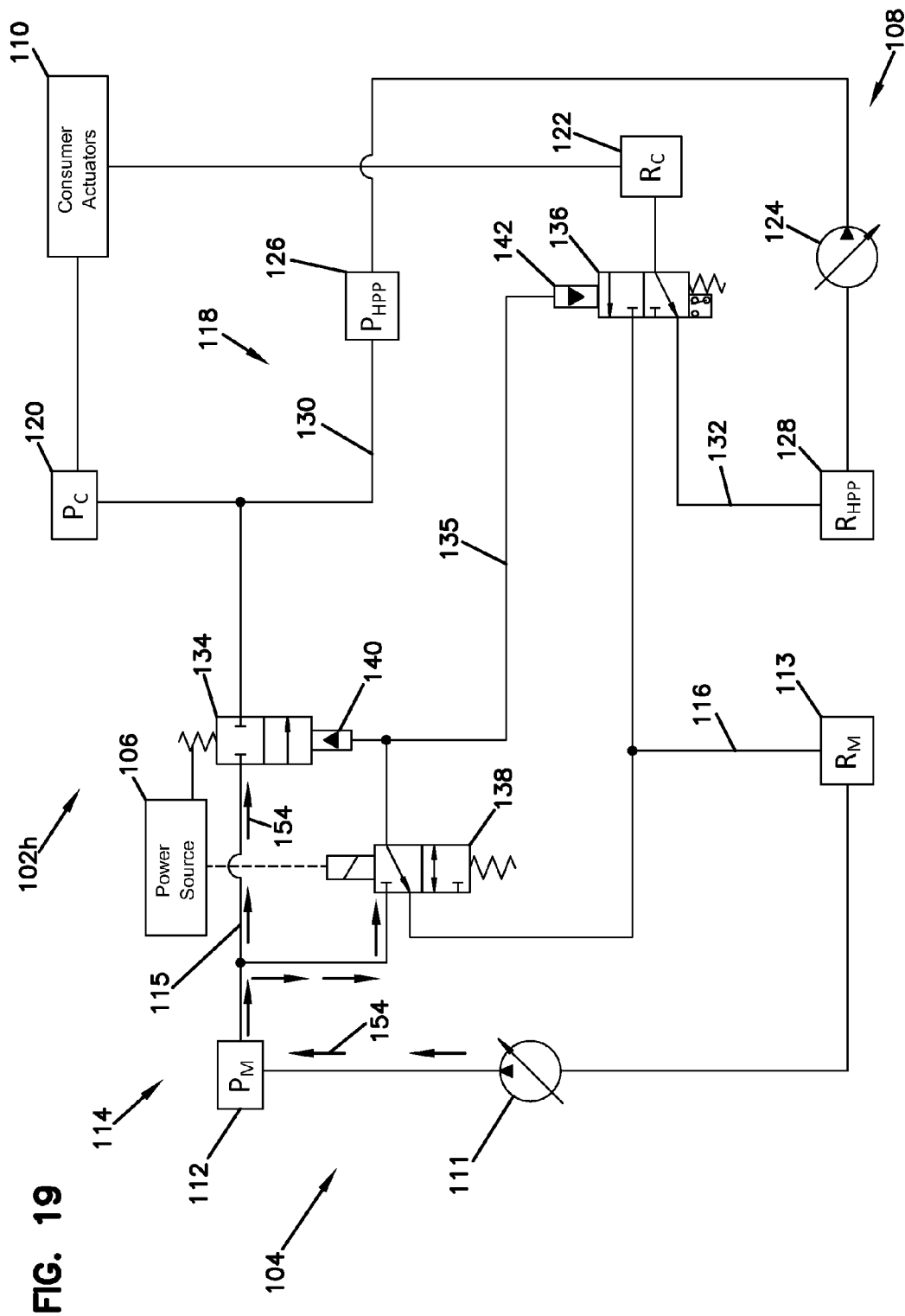
FIG. 19 illustrates an embodiment of a schematic of the hydraulic system section shown in FIGS. 17 and 18 in an isolation mode of operation in accordance with the principles of the present disclosure.

Referring to FIGS. 17-19, an embodiment of a of a hydraulic system section 102h in a main mode, a backup mode, and an isolation mode of operation in accordance with the principles of the present disclosure are illustrated. In this embodiment of the hydraulic system section 102h, the first solenoid valve 138 is spring biased into a first position and the first and second pilot operated shutoff valves 134, 136 are spring biased into their second positions.

In this embodiment of the hydraulic system section 102h, the main system 104 is isolated from the one or more consumers 110 by actuating the first solenoid valve 138 to the second position with power from the electric power source 106. Further, in this embodiment of the hydraulic system section 102h, the main system 104 is isolated from the one or more consumers 110 by turning off the main pump 111 and providing no pressure to the first and second pilot ports 140 and 142 causing the first and second pilot operated shutoff valves 134 and 136 to default to their second positions or spring biased positions.

Accordingly, in this embodiment, in the event of leak, the main system 104 can be isolated from the one or more consumers 110 by utilizing power from the power source 106 or by not providing pressure through the section 102h from the main system 104. The flow of hydraulic fluid through section 102h in FIGS. 17-19 is illustrated by the flow arrows 154.

Therefore, as illustrated in FIG. 17 in the main mode of operation, the first and second pilot operated shutoff valves 134 and 136 are actuated into their first positions. As illustrated in FIG. 18 in the backup mode of operation, no valves are actuated. As illustrated in FIG. 19 in the isolation mode of operation, the first solenoid valve 138 is actuated into its second position.

The above specification provides examples of how certain inventive aspects may be put into practice. It will be appreciated that the inventive aspects can be practiced in other ways than those specifically shown and described herein without departing from the spirit and scope of the inventive aspects of the present disclosure.

We claim:

1. An isolation valve arrangement, comprising:
a main port;
a main return port;
a backup port;
a backup return port;
a consumer port;
a consumer return port;
a first main fluid flow path for a main system that extends from the main port to the consumer port;
a second main fluid flow path for the main system that extends from the consumer return port to the main return port;
a first backup fluid flow path for a backup system that extends from the backup port to the consumer port;
a second backup fluid flow path for the backup system that extends from the consumer return port to the backup return port;
a first pilot operated shutoff valve located on the first main fluid flow path between the main port and the consumer port that in a first position provides fluid communication between the main port and the consumer port and in a second position prevents fluid communication between the main port to the consumer port;
a first pilot port connected to the first pilot operated shutoff valve;
a second pilot operated shutoff valve located on the second main fluid flow path between the consumer return port and the main return port that in a first position provides fluid communication between the consumer return port and the main return port and in a second position prevents fluid communication between the consumer return port and the main return port;
a second pilot port connected to the second pilot operated shutoff valve; and
a pilot flow path that extends from the main port to the first and the second pilot ports of the first and second pilot operated shut off valves; and
a first solenoid valve located on the pilot flow path between the main port and the first and the second pilot ports of the first and the second pilot operated shutoff valves that in a first position provides fluid communication between the main port and the first and the second pilot ports and in a second position prevents fluid communication between the main port and the first and the second pilot ports,
wherein the main system is isolated from a consumer without requiring backup pressure from the backup system.

2. The isolation valve arrangement of claim 1, wherein the first main fluid flow path is isolated from the consumer without requiring utilization of main pressure.

3. The isolation valve arrangement of claim 2, wherein the first main fluid flow path is isolated from the consumer by utilizing power from an electrical power source.

4. The isolation valve arrangement of claim 2, wherein the first main fluid flow path is isolated from the consumer when main pressure is not provided by the main system.

5. The isolation valve arrangement of claim 2, wherein the first solenoid valve is spring biased into the first position.

6. The isolation valve arrangement of claim 5, wherein the first pilot operated shutoff valve is spring biased into the second position and the second pilot operated shutoff valve is spring biased into the second position.

7. The isolation valve arrangement of claim 6, wherein the second position of the second pilot operated shutoff valve further provides fluid communication between the consumer return port and the backup return port.

8. The isolation valve arrangement of claim 7, wherein the second position of the first solenoid valve further provides fluid communication between the pilot flow path and the main return port.

9. The isolation valve arrangement of claim 1, wherein the first main fluid flow path is isolated from the consumer by utilizing main pressure and power from an electrical power source.

10. The isolation valve arrangement of claim 9, wherein the first main fluid flow path is isolated from the consumer by utilizing backup pressure.

11. The isolation valve arrangement of claim 10, wherein the first solenoid valve is spring biased into the second position.

12. The isolation valve arrangement of claim 11, wherein the first pilot operated shutoff valve is spring biased into the first position and the second pilot operated shutoff valve is spring biased into the first position.

13. The isolation valve arrangement of claim 12, further comprising:
  a third pilot operated shutoff valve located on the second backup fluid flow path between the consumer return port and the backup return port; and
  a third pilot port connected to the third pilot operated shutoff valve, wherein the third pilot port is located on a flow path selected from a group of: the pilot flow path adjacent to the second pilot port and the first backup fluid flow path adjacent to the backup port,
  wherein the third pilot operated shutoff valve prevents fluid communication between the consumer return port and the backup return port when the third pilot operated shutoff valve is in a spring biased position, and
  wherein the third pilot operated shutoff valve provides fluid communication between the consumer return port and the backup return port when the third pilot operated shutoff valve is in an actuated position.

14. The isolation valve arrangement of claim 13, wherein the second position of the first solenoid valve further provides fluid communication between the pilot flow path and the main return port.

15. The isolation valve arrangement of claim 14, further comprising a flow path valve located on the first main fluid flow path between the main port and the pilot flow path and located on the first backup fluid flow path between the backup port and the pilot flow path that in a first position provides fluid communication between the main port and the pilot flow path while further preventing fluid communication between the backup port and the pilot flow path and in a second position provides fluid communication between the backup port and the pilot flow path while further preventing fluid communication between the main port and the pilot flow path,
  wherein the flow path valve is selected from a group of: a shuttle valve and a second solenoid valve.

16. The isolation valve arrangement of claim 15, further comprising:
  a fourth pilot operated shutoff valve located on the first main fluid flow path between the first solenoid valve and the flow path valve that in a spring biased position provide fluid communication between the main port and the flow path valve and in an actuated position prevents fluid communication between the main port and the flow path valve; and
  a fourth pilot port connected to the fourth pilot operated shutoff valve, wherein the fourth pilot port is located on the second backup fluid flow path adjacent to the backup port.

17. A zonal hydraulic system comprising:
  a power source;
  a main port;
  a main return port;
  a backup port;
  a backup return port;
  a consumer port;
  a consumer return port;
  a first circuit for a main system that extends from the main port to the consumer port through a consumer and back from the consumer return port to the main return port;
  a main pump connected to the main port and the main return port, the main pump is configured to pump main fluid through the main port and to receive the main fluid returned through the main return port;
  a second circuit for a backup system that extends from the backup port to the consumer port through the consumer and back from the consumer return port to the backup return port;
  a backup pump connected to the backup port and the backup return port, the backup pump is configured to pump backup fluid through the backup port and to receive the backup fluid returned through the backup return port;
  a first pilot operated shutoff valve located on the first circuit between the main port and the consumer port that in a first position provides fluid communication between the main port and the consumer port and in a second position prevents fluid communication between the main port and the consumer port;
  a first pilot port connected to the first pilot operated shutoff valve;
  a second pilot operated shutoff valve located on the first circuit between the consumer return port and the main return port that in a first position provides fluid communication between the consumer return port and the main return port and in a second position prevents fluid communication between the consumer return port and the main return port;
  a second pilot port connected to the second pilot operated shutoff valve; and
  a pilot flow path that extends from the main port to the first and the second pilot ports of the first and second pilot operated shut off valves;
  a first solenoid valve connected to an electrical power source and located on the pilot flow path between the main port and the first and the second pilot ports of the first and the second pilot operated shutoff valves that in a first position provides fluid communication between the main port and the first and the second pilot ports and in a second position prevents fluid communication between the main port and the first and the second pilot ports,
  wherein the first circuit is isolated from the consumer without requiring utilization of the backup fluid.

18. The zonal hydraulic system of claim 17, wherein the first circuit is isolated from the consumer without requiring utilization of the main fluid.

19. The zonal hydraulic system of claim 18, wherein the first circuit is isolated from the consumer by utilizing power from the power source.

20. The zonal hydraulic system of claim 18, wherein the first circuit is isolated from the consumer when the main pump does not pump the main fluid through the main port.

21. The zonal hydraulic system of claim 18, wherein the first solenoid valve is spring biased into the first position.

22. The zonal hydraulic system of claim 21, wherein the first pilot operated shutoff valve is spring biased into the second position and the second pilot operated shutoff valve is spring biased into the second position.

23. The zonal hydraulic system of claim 22, wherein the second position of the second pilot operated shutoff valve further provides fluid communication between the consumer return port and the backup return port.

24. The zonal hydraulic system of claim 23, wherein the second position of the first solenoid valve further provides fluid communication between the pilot flow path and the main return port.

25. The zonal hydraulic system of claim 18, wherein the first circuit is isolated from the consumer by utilizing the main fluid and power from the power source.

26. The zonal hydraulic system of claim 25, wherein the first circuit is isolated from the consumer by utilizing the backup fluid.

27. The zonal hydraulic system of claim 26, wherein the first solenoid valve is spring biased into the second position.

28. The zonal hydraulic system of claim 27, wherein the first pilot operated shutoff valve is spring biased into the first position and the second pilot operated shutoff valve is spring biased into the first position.

29. The zonal hydraulic system of claim 28, further comprising:
- a third pilot operated shutoff valve located on the second circuit between the consumer return port and the backup return port; and
- a third pilot port connected to the third pilot operated shutoff valve, wherein the third pilot port is located on a flow path selected from a group of: the pilot flow path adjacent to the second pilot port and the second circuit adjacent to the backup port,
- wherein the third pilot operated shutoff valve prevents fluid communication between the consumer return port and the backup return port when the third pilot operated shutoff valve is in a spring biased position, and
- wherein the third pilot operated shutoff valve provides fluid communication between the consumer return port and the backup return port when the third pilot operated shutoff valve is in an actuated position.

30. The zonal hydraulic system of claim 29, wherein the second position of the first solenoid valve further provides fluid communication between the pilot flow path and the main return port.

31. The zonal hydraulic system of claim 30, further comprising a flow path valve located on the first circuit between the main port and the pilot flow path and located on the second circuit between the backup port and the pilot flow path that in a first position provides fluid communication between the main port and the pilot flow path while further preventing fluid communication between the backup port and the pilot flow path and in a second position provides fluid communication between the backup port and the pilot flow path while further preventing fluid communication between the main port and the pilot flow path,
- wherein the flow path valve is selected from a group of: a shuttle valve and a second solenoid valve.

32. The zonal hydraulic system of claim 31, further comprising:
- a fourth pilot operated shutoff valve located on the first circuit between the first solenoid valve and the flow path valve that in a spring biased position provide fluid communication between the main port and the flow path valve and in an actuated position prevents fluid communication between the main port and the flow path valve,
- a fourth pilot port connected to the fourth pilot operated shutoff valve, wherein the fourth pilot port is located on the second circuit adjacent to the backup port.

* * * * *